(12) United States Patent
Alcalay et al.

(10) Patent No.: US 12,459,608 B2
(45) Date of Patent: Nov. 4, 2025

(54) CONTROLLED FLOATING SOLAR MODULE

(71) Applicant: XFLOAT LTD., Netanya (IL)

(72) Inventors: Avi Alcalay, Michmoret (IL); Ran Alcalay, Hofit (IL)

(73) Assignee: XFLOAT LTD., Netanya (IL)

( * ) Notice: Subject to any disclaimer, the term of this patent is extended or adjusted under 35 U.S.C. 154(b) by 849 days.

(21) Appl. No.: 17/428,954

(22) PCT Filed: Feb. 5, 2020

(86) PCT No.: PCT/IL2020/050142
§ 371 (c)(1),
(2) Date: Aug. 5, 2021

(87) PCT Pub. No.: WO2020/161714
PCT Pub. Date: Aug. 13, 2020

(65) Prior Publication Data
US 2022/0126951 A1 Apr. 28, 2022

Related U.S. Application Data

(60) Provisional application No. 62/801,747, filed on Feb. 6, 2019.

(51) Int. Cl.
*B63B 22/20* (2006.01)
*B63B 1/10* (2006.01)
(Continued)

(52) U.S. Cl.
CPC ............... *B63B 22/20* (2013.01); *B63B 1/10* (2013.01); *B63B 35/44* (2013.01); *B63B 39/03* (2013.01);
(Continued)

(58) Field of Classification Search
CPC .......... B63B 22/20; B63B 1/10; B63B 35/44; B63B 39/03; B63B 2035/4453; H02S 10/40; H02S 20/32
See application file for complete search history.

(56) References Cited

U.S. PATENT DOCUMENTS 8,921,682 B2  12/2014  Yang et al.
9,677,787 B2  6/2017  Tennler
(Continued)

FOREIGN PATENT DOCUMENTS

CN  201215928 Y  4/2009
CN  103696899 A  4/2014
(Continued)

OTHER PUBLICATIONS

International search report for PCT/IL2020/050142 dated May 27, 2020.
Written opinion for PCT/IL2020/050142 dated May 27, 2020.

*Primary Examiner* — Andrew Polay
(74) *Attorney, Agent, or Firm* — The Roy Gross Law Firm, LLC; Roy D. Gross

(57) ABSTRACT

A buoyant module comprising a base configured for being buoyantly supported within a body of water, wherein said base defines a space which is in fluid communication with said body of water; a fluid-holding container sized and fitted for being received within said space and for moving in a vertical dimension relative to said base; and wherein a vertical position of said container relative to said base is determined, at least in part, by a fluid level in said container.

19 Claims, 34 Drawing Sheets

(51) Int. Cl.
  *B63B 35/44* (2006.01)
  *B63B 39/03* (2006.01)
  *H02S 10/40* (2014.01)
  *H02S 20/32* (2014.01)
(52) U.S. Cl.
  CPC .............. *H02S 10/40* (2014.12); *H02S 20/32* (2014.12); *B63B 2035/4453* (2013.01)

(56) References Cited

U.S. PATENT DOCUMENTS

| | | | |
|---|---|---|---|
| 2012/0325290 | A1 | 12/2012 | Gizara |
| 2013/0146127 | A1 | 6/2013 | Lunoe et al. |
| 2014/0034110 | A1* | 2/2014 | Yang ........................ F24S 20/70 136/246 |
| 2016/0087573 | A1 | 3/2016 | Yang et al. |
| 2017/0040926 | A1 | 2/2017 | Smadja et al. |
| 2017/0310274 | A1* | 10/2017 | Tennler ................. F24S 30/425 |
| 2022/0231633 | A1* | 7/2022 | Cavalli ................... F24S 20/70 |

FOREIGN PATENT DOCUMENTS

| | | |
|---|---|---|
| CN | 103888047 A | 6/2014 |
| CN | 105227103 A | 1/2016 |
| CN | 204993211 U | 1/2016 |
| CN | 205028163 U | 2/2016 |
| CN | 205029614 U | 2/2016 |
| DE | 10156184 A1 | 6/2003 |
| DE | 102006019753 A1 | 10/2007 |
| DE | 102014001743 A1 | 8/2015 |
| DE | 202015005898 U1 | 9/2016 |
| EP | 2058222 A1 | 5/2009 |
| EP | 3085951 A1 | 10/2016 |
| FR | 2958382 A1 | 10/2011 |
| FR | 3022953 A1 | 1/2016 |
| IN | 1717MUM2015 A | 5/2016 |
| JP | S54161639 A | 2/1985 |
| JP | S61195244 A | 8/1986 |
| JP | 2014024372 A | 2/2014 |
| JP | 2014139032 A | 7/2014 |
| JP | 2015205632 A | 11/2015 |
| KR | 20110101508 A | 9/2011 |
| KR | 20120120679 A | 4/2013 |
| KR | 20150051352 A | 5/2015 |
| KR | 101923542 B1 | 11/2018 |
| KR | 20180130058 A | 6/2019 |
| TW | M500816 U | 5/2015 |
| WO | 2013105700 A1 | 7/2013 |
| WO | 2014088207 A1 | 6/2014 |
| WO | 2016100995 A1 | 6/2016 |

* cited by examiner

CONTROLLED FLOATING SOLAR MODULE

CROSS REFERENCE TO RELATED APPLICATIONS

This application is a National Phase of PCT Patent Application No. PCT/IL2020/050142 having International filing date of Feb. 5, 2020, which claims the benefit of priority under 35 U.S.C. § 119(e) of from U.S. Provisional Patent Application No. 62/801,747, filed on Feb. 6, 2019, entitled "FLOATING SOLAR PANEL MODULE". The contents of the above applications are all which are incorporated by reference as if fully set forth herein in their entirety.

FIELD OF THE INVENTION

The present invention, in some embodiments thereof, relates to the field of photovoltaic power systems and, more particularly, but not exclusively, to floating solar panel modules for photovoltaic power systems.

BACKGROUND

Solar energy is a clean and inexhaustible natural resource and one of the most promising renewable energy technologies. Only a very small fraction of the solar radiation reaching the earth every year would be needed to make a significant step toward global energy sustainability. However, for solar power plants to offer the same generating capacity and supply stability as traditional power plants, the required land area is very large.

In order to efficiently use the available surface area, therefore, solar power could be moved to lakes, artificial reservoirs, and/or oceans, improving the utilization of land while preserving human living space and land for agriculture, as well as preserving natural reserve areas, for example, by utilizing spaces designated for other industrial uses. Consequently, floating solar arrays have generated great interest in recent years.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a buoyant module comprising a base configured for being buoyantly supported within a body of water, wherein said base defines a space which is in fluid communication with said body of water; a fluid-holding container sized and fitted for being received within said space and for moving in a vertical dimension relative to said base; and wherein a vertical position of said container relative to said base is determined, at least in part, by a fluid level in said container.

In some embodiments, said base is a vessel and said space is an inner chamber of said vessel.

In some embodiments, said vessel is a double-walled vessel comprising an outer wall and an inner wall, wherein an interspace between said outer and inner walls is configured for being at least partially filled with a ballast comprising one or more of a liquid and a solid.

In some embodiments, said base comprises at least two hulls arranged in a spaced-apart position, wherein said hulls are rigidly interconnected to one another, wherein said space is defined between said hulls.

In some embodiments, said base is at least partially filled with a ballast comprising one or more of a liquid and a solid.

In some embodiments, said movement in the vertical dimension of said container is in a range of between 10 and 300 cm.

In some embodiments, the module further comprises a mount coupled to said base and configured for pivotably mounting a solar panel thereon, wherein said solar panel is tiltable about a pivot point relative to said mount.

In some embodiments, the module further comprises a tilt mechanism configured for translating said movement in the vertical dimension of said container into said pivotable motion of said solar panel about said pivot point.

In some embodiments, said tilt mechanism is configured for tilting said solar panel between 25° and 75° to either one side or two sides, relative to the horizontal.

In some embodiments, said tilt mechanism is configured such that a center of gravity of said solar panel is located below or on said pivot point.

In some embodiments, said tilt mechanism comprises one of: a cable-and-pulley tilt mechanism, a crank-like tilt mechanism, and an arcuate slot tilt mechanism, a parallelogram with an underwater symmetrical frame, and a parallelogram with an underwater asymmetrical frame and push/pull rods.

In some embodiments, said vessel further comprises one or more openings configured for providing said fluid communication between said body of water and said inner chamber, wherein at least some of said one or more openings are dimensioned for regulating a rate of flow of fluid between said body of water and said inner chamber.

In some embodiments, said regulating is achieved by using a control valve configured for regulating a rate of flow of fluid between said body of water and said inner chamber.

In some embodiments, the module further comprises a control unit in fluid communication with said container, wherein the control unit is configured for selectively adjusting a fluid level within said container.

In some embodiments, the module further comprises a pipe connected between said control unit and said container.

In some embodiments, said pipe is mounted to said base and has at least an extendable portion configured for facilitating said movement in the vertical dimension of said container.

In some embodiments, said control unit further comprises a pump configured for pumping said fluid into and/or out of said container through said pipe.

In some embodiments, said control unit is configured for adjusting said fluid level within said container based, at least in part, on the position of the sun on the ecliptic in respect to the geographic location of the module.

There is further provided, in an embodiment, a system comprising a plurality of buoyant modules comprising each a base configured for being buoyantly supported within a body of water, wherein said base defines a space which is in fluid communication with said body of water, and a fluid-holding container sized and fitted for being received within said space and for moving in the vertical dimension relative to said base, wherein a vertical position of said container relative to said base is based, at least in part, on a fluid level in said container; a framework comprising frame members configured for rigidly interconnecting said modules in a specified arrangement; and a control unit in fluid communication with each of said containers, wherein the control unit is configured for selectively adjusting a fluid level within said containers.

In some embodiments, said plurality of modules is arranged in a grid array field comprising rows and columns.

In some embodiments, said base is a vessel and said space is an inner chamber of said vessel.

In some embodiments, said vessel is a double-walled vessel comprising an outer wall and an inner wall, wherein an interspace between said outer and inner walls is configured for being at least partially filled with a ballast comprising one or more of a liquid and a solid.

In some embodiments, said base comprises at least two hulls arranged in a spaced-apart position, wherein said hulls are rigidly interconnected to one another, wherein said space is defined between said hulls.

In some embodiments, said base is at least partially filled with a ballast comprising one or more of a liquid and a solid.

In some embodiments, said movement in the vertical dimension of said container is in a range of between 10 and 300 cm.

In some embodiments, said base further comprises a mount coupled to said base and configured for pivotably mounting a solar panel thereon, wherein said solar panel is tiltable about a pivot point relative to said mount.

In some embodiments, said base further comprises a tilt mechanism configured for translating said movement in the vertical dimension of said container into said pivotable motion of said solar panel about said pivot point.

In some embodiments, said tilt mechanism is configured for tilting said solar panel between 25° and 75° to either side relative to the horizontal.

In some embodiments, said tilt mechanism is configured such that a center of gravity of said solar panel is located below or on said pivot point.

In some embodiments, said tilt mechanism comprises one of: a cable-and-pulley tilt mechanism, a crank-like tilt mechanism, and an arcuate slot tilt mechanism, a parallelogram with an underwater symmetrical frame, and a parallelogram with an underwater asymmetrical frame and push/pull rods In some embodiments, said vessel further comprises one or more openings configured for providing said fluid communication between said body of water and said inner chamber, wherein at least some of said one or more openings are dimensioned for regulating a rate of flow of fluid between said body of water and said inner chamber.

In some embodiments, said regulating is achieved by using a control valve configured for regulating a rate of flow of fluid between said body of water and said inner chamber.

In some embodiments, the system further comprises a control unit in fluid communication with said containers, wherein the control unit is configured for selectively adjusting a fluid level within said containers.

In some embodiments, the system further comprises a pipe grid configured for connecting said control unit with each of said containers.

In some embodiments, said control unit further comprises a pump configured for pumping said fluid into and/or out of said container through said pipe grid.

In some embodiments, said control unit is configured for adjusting said fluid level within said containers based, at least in part, on the position of the sun on the ecliptic in respect to the geographic location of the module.

In some embodiments, said solar panels are further configured for tilting in unison.

In some embodiments, said framework further comprises one or more lines configured for mooring said system.

In some embodiments, said one or more lines are further configured for facilitating adjustment of an azimuth angle of said system.

There is further provided, in an embodiment, a method comprising: providing a system comprising plurality of buoyant modules, comprising each a base configured for being buoyantly supported within a body of water, wherein said base defines a space which is in fluid communication with said body of water, and a fluid holding container sized and fitted for being received within said space and for moving in the vertical dimension relative to said base, wherein a vertical position of said container relative to said base is determined, at least in part, based on a fluid level in said container; rigidly interconnecting said modules in a specified arrangement using a framework comprising frame members configured for providing a control unit in fluid communication with each of said containers, wherein the control unit is configured for selectively adjusting a fluid level within said containers; and deploying said system in a body of water.

In some embodiments, said interconnecting comprises interconnecting said plurality of modules in a grid array field comprising rows and columns.

In some embodiments, said base is a vessel and said space is an inner chamber of said vessel.

In some embodiments, said vessel is a double-walled vessel comprising an outer wall and an inner wall, wherein an interspace between said outer and inner walls is configured for being at least partially filled with a ballast comprising one or more of a liquid and a solid.

In some embodiments, said base comprises at least two hulls arranged in a spaced-apart position, wherein said hulls are rigidly interconnected to one another, wherein said space is defined between said hulls.

In some embodiments, said base is at least partially filled with a ballast comprising one or more of a liquid and a solid.

In some embodiments, said movement in the vertical dimension of said container is in a range of between 10 and 300 cm.

In some embodiments, said base further comprises a mount coupled to said base and configured for pivotably mounting a solar panel thereon, wherein said solar panel is tiltable about a pivot point relative to said mount.

In some embodiments, said base further comprises a tilt mechanism configured for translating said movement in the vertical dimension of said container into said pivotable motion of said solar panel about said pivot point.

In some embodiments, said tilt mechanism is configured for tilting said solar panel between 25° and 75° to either side relative to the horizontal.

In some embodiments, said tilt mechanism is configured such that a center of gravity of said solar panel is located below or on said pivot point.

In some embodiments, said tilt mechanism comprises one of: a cable-and-pulley tilt mechanism, a crank-like tilt mechanism, and an arcuate slot tilt mechanism, a parallelogram with an underwater symmetrical frame, and a parallelogram with an underwater asymmetrical frame and push/pull rods.

In some embodiments, said vessel further comprises one or more openings configured for providing said fluid communication between said body of water and said inner chamber, wherein at least some of said one or more openings are dimensioned for regulating a rate of flow of fluid between said body of water and said inner chamber.

In some embodiments, said regulating is achieved by using a control valve configured for regulating a rate of flow of fluid between said body of water and said inner chamber.

In some embodiments, said system further comprises a control unit in fluid communication with said containers, wherein the control unit is configured for selectively adjusting a fluid level within said containers.

In some embodiments, said system further comprises a pipe grid configured for connecting said control unit with each of said containers.

In some embodiments, said control unit further comprises a pump configured for pumping said fluid into and/or out of said container through said pipe grid.

In some embodiments, said control unit is configured for adjusting said fluid level within said containers based, at least in part, on the position of the sun on the ecliptic in respect to the geographic location of the module.

In some embodiments, said solar panels are further configured for tilting in unison.

In some embodiments, said framework further comprises one or more lines configured for mooring said system.

In some embodiments, said one or more lines are further configured for facilitating adjustment of an azimuth angle of said system.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
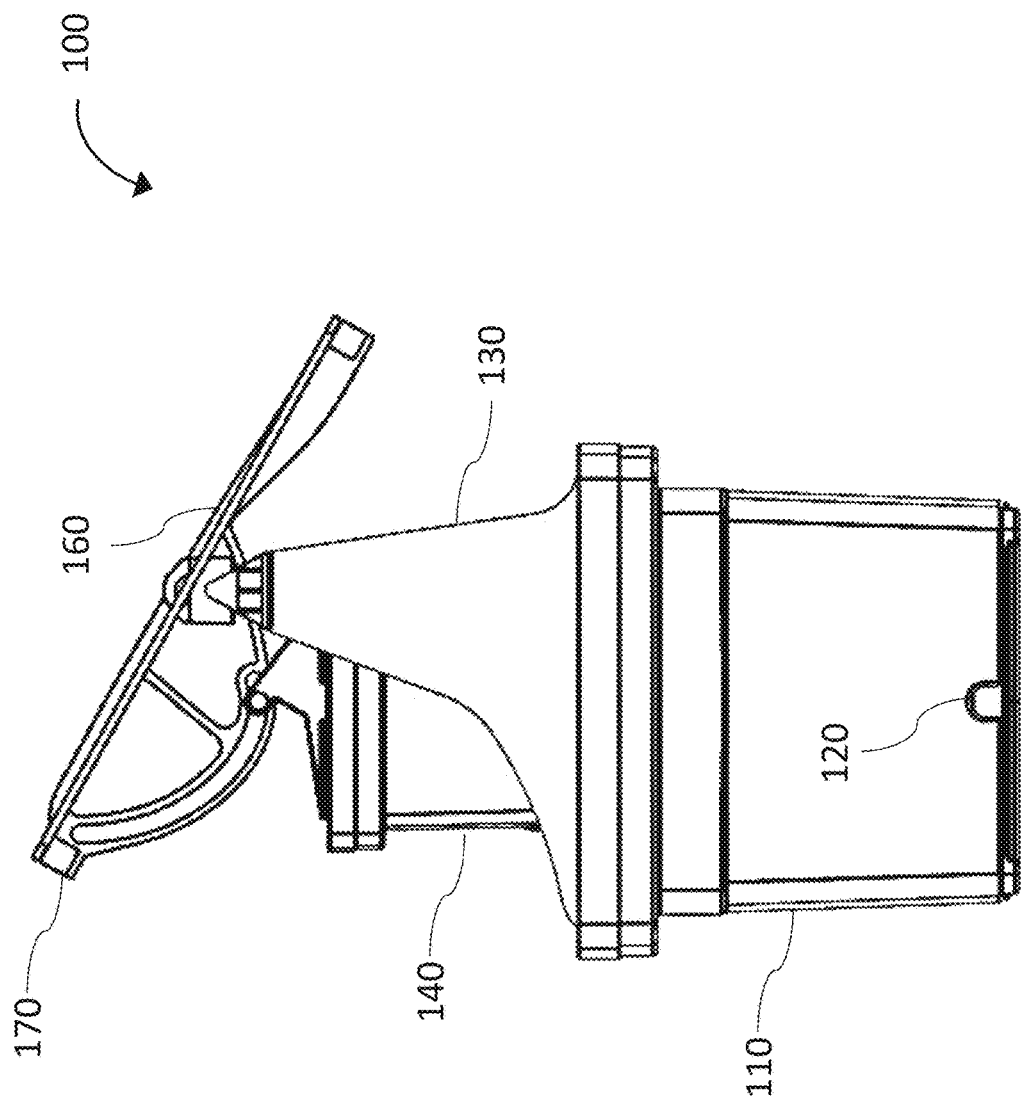
FIGS. 1A-1D illustrate an exemplary floating solar panel module in accordance with some embodiments of the present invention.
Figure 1B:
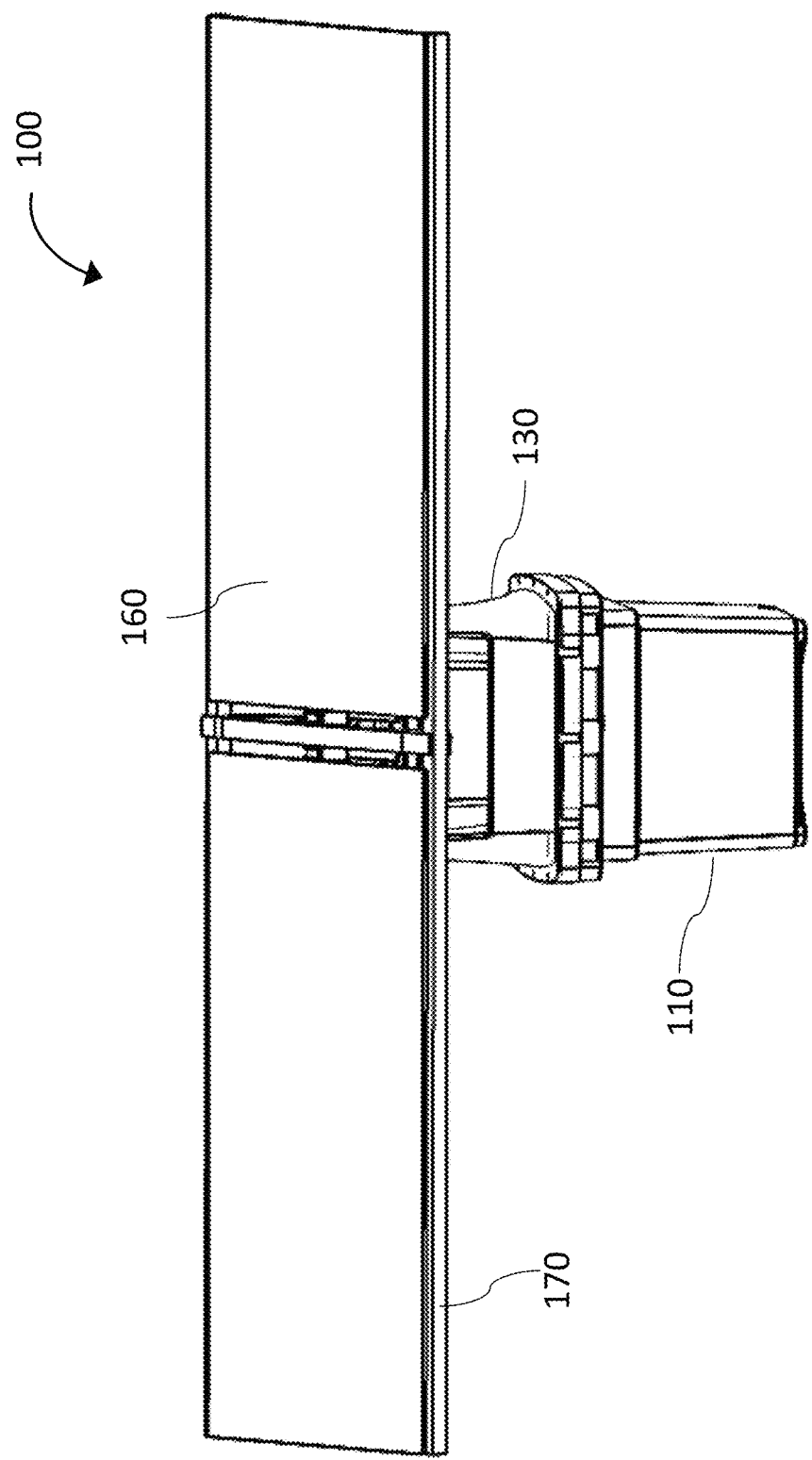

Disclosed herein is a floating module configured for deployment in a body of water, such as the ocean, a lake, or a reservoir. In some embodiments, the floating module is a floating panel module. In some embodiments, the panel module comprises a solar panel. In some embodiments, the panels comprise one or more antennas and/or other elements that require tracking or other rotational movement. Though the floating module disclosed herein may be operable with various moveable elements, for the purpose of simplification of explanation, from this point on, reference will be made only to a floating solar panel module. In some embodiments, and as described in greater detail elsewhere herein, the present module provides for remote adjustment of a tilt angle of the solar panel, so as to cause the solar panel to be oriented towards the sun, for example, during different times of the day. In some embodiments, the present module comprises a simple hydrostatic tilt adjustment mechanism which does not require the use of hydraulics, pneumatics, servo and/or other sensitive electric motors, or any similar type of mechanism. In some embodiments, the hydrostatic tilt adjustment mechanism may be controlled and operated remotely, through a fluid supply line connected to the module. In some embodiments, the tilt mechanism of the present invention is configured for moderating abrupt changes in the tilt angle of the solar panel caused by, e.g., ambient wind conditions and wave frequencies. In some embodiments, the tilt mechanism of the present invention is configured for optimizing efficiency of the panels by tilting the panels to an angle in which the efficiency is optimal. In some embodiments, the present invention is configured for optimizing efficiency of the panels by using bi-facial panels, e.g. by having no torque tube shading the rear side of such panels. In some embodiments, the tilt mechanism of the present invention is configured for optimizing efficiency of the panels by tilting the panels about a plurality of axes, wherein the axes are distanced from each other at a specific distance such that panels tilted about a first do not cast shadows on panels tilted about a second axis (e.g., backtracking).

Also disclosed is a system comprising an array field of interconnected floating solar panel modules of the present invention, configured for deployment in a body of water. In some embodiments, individual modules of the present system may be rigidly interconnected, so as to be able to withstand ambient wind, wave, and similar conditions. In some embodiments, the present system may be configured for remotely adjusting a tilt angle of some or more of the solar panels in the array, individually or in unison. In some embodiments, the present system may be configured for adjusting an azimuth orientation of the system within the body of water, e.g., in response to the sun direction, wind, ambient conditions, or the changing seasons.

A potential advantage of the present invention is, therefore, in that it provides for a floating solar panel module that is tilt-adjustable, requires low-maintenance, and is efficient to operate as part of an array field of modules. The present module has a minimal number of moving parts, a relatively small footprint, is inexpensive to manufacture, and further provides for ease of storage, transportation, and on-site assembly.

A potential advantage of an array of modules positioned in a body of water that has a framework comprising frame members configured for rigidly interconnecting floating modules, is in that the array covers a small percentage of the body of water, hence the effect of reduced sun light and/or oxygen absorption from the water surface, are substantially smaller compare to systems built of interconnected floats.

In some embodiments, the present invention comprises a base. In some embodiments, the base comprises two or more sections, such as hulls, configured for being buoyantly supported within a body of water. In some embodiments, the hulls are interconnected, e.g., alongside, in a spaced-apart arrangement, so as to create a space therebetween for receiving a movable container in a way which permits movement of the container, for example, in a substantially vertical dimension.

In some embodiments, the hulls combine a system of buoyancy and ballast, so as to achieve a desired floating elevation and orientation of the hulls relative to a fluid level, for example, of a body of water, and to re-assume such desired floating elevation and orientation following a disruption, such as in strong winds and/or currents conditions. For example, in some embodiments, the hulls are hollow, and, in some embodiments, the hulls are configured for fully or partially filling with water, another liquid, or a solid matter to provide desired ballast. In some embodiments, the base is positioned adjacent to the container. In some embodiments, and as described in greater detail elsewhere herein, one or more bases are scattered between a plurality of containers. In some embodiments, the base is separable from the container.

Figure 1C:
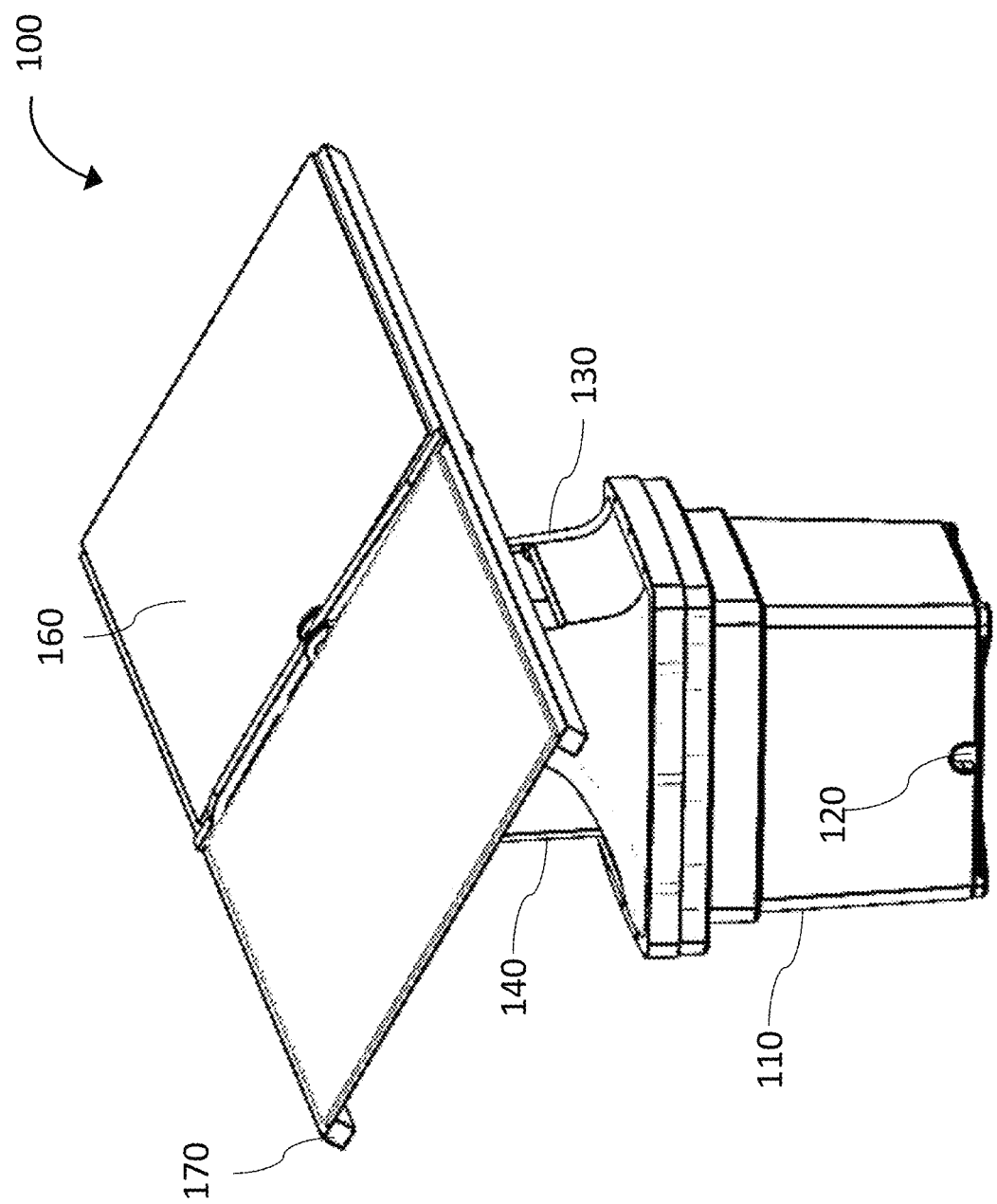
Figure 1D:
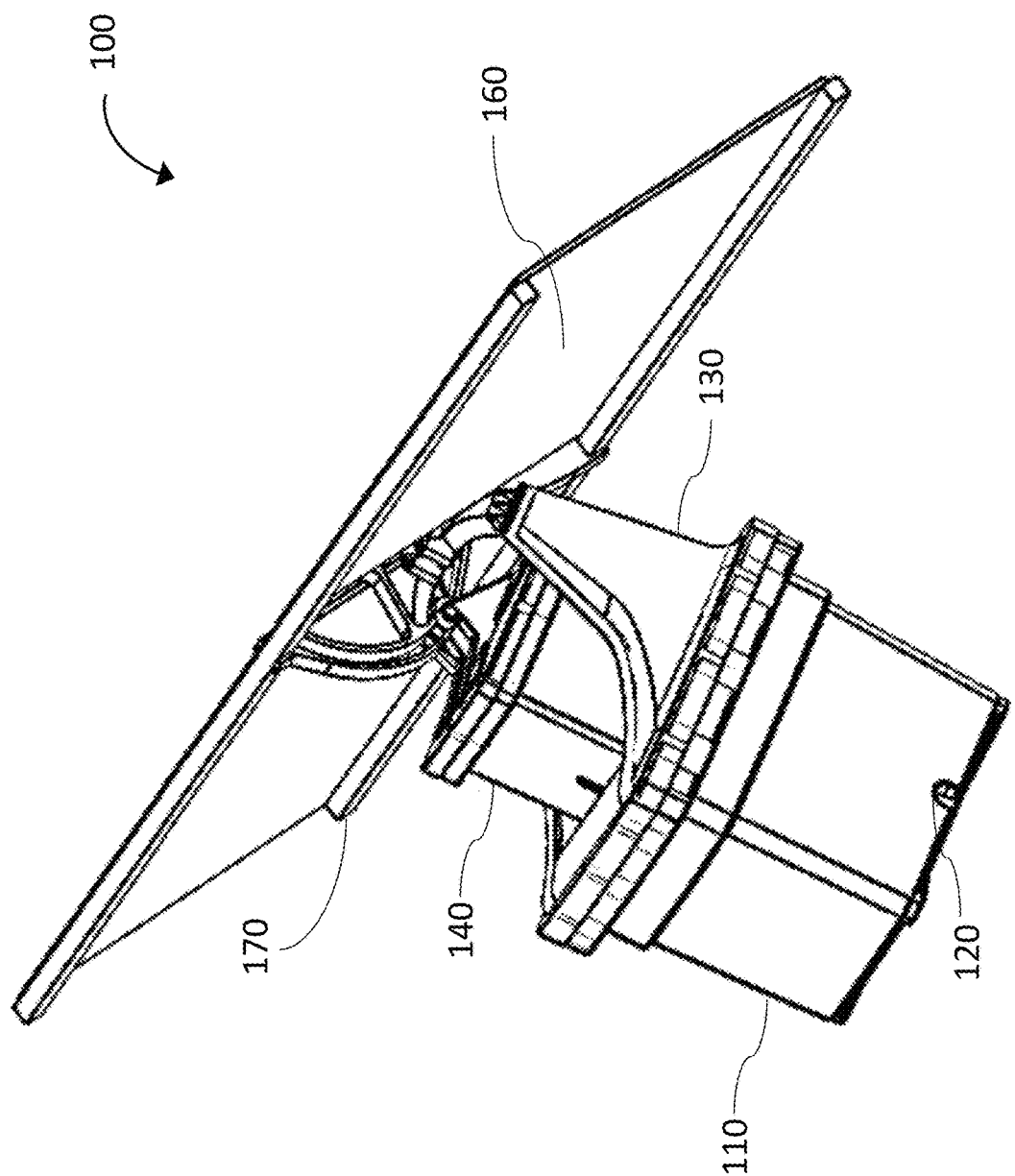

FIGS. 1A-1D illustrate an exemplary floating solar panel module of the present invention, in side (FIG. 1A), front (FIG. 1B), and perspective views (FIG. 1C-1D). Module 100 comprises, in some embodiments, a base 110. Base 110 may comprise a single vessel, or, in some embodiments, two or more sections, configured for being buoyantly supported within a body of water. In some embodiments, Module 100 comprises one or more mounts, such as, for example, mount 130, coupled to base 110. In some embodiments, mount 130 is connected to a top portion of base 110. A solar panel support frame 170 holding a solar panel 160 may be pivotably mounted to mount 130, so as to permit adjustment of a tilt angle of support frame 170 relative to the horizontal.

In some embodiments, a container 140 is received within a flooded interior chamber of base 110. In embodiments where base 110 comprises two or more sections, container 140 may be received within a space between the spaced-apart sections of base 110. In each case, container 140 is configured for moving in the vertical dimension relative to base 110. In some embodiments, container 140 is configured to move vertically in a range between 10 and 300 cm. In some embodiments, the container is a fluid holding container. In some embodiments, the vertical position of container 140 may be adjusted by selectively adjusting a fluid level within container 140. In some embodiments, a tilt mechanism operatively connects support frame 170 and container 140, wherein changes in the vertical position of container 140 relative to base 110 are translated into changes in the tilt angle (e.g., FIGS. 9B and 9C; a, a') with respect to the horizontal (X axis) of support frame 170 and, thus, solar panel 160.

In some embodiments, the weight of liquid within container 140 further provides for a balancing effect which helps to maintain the position of container 140 and/or the module as a whole against disruptive external forces (such as wind). In some embodiments, the buoyancy of the container 140 maintains the position of the container 140 and balances the module as a whole against disruptive external forces (such as wind). In some embodiments, the buoyancy of the container 140 prevents the container 140 from being pushed into the water, while the weight of the container 140 prevents to container 140 from being pulled out of the water.

Figure 2A:
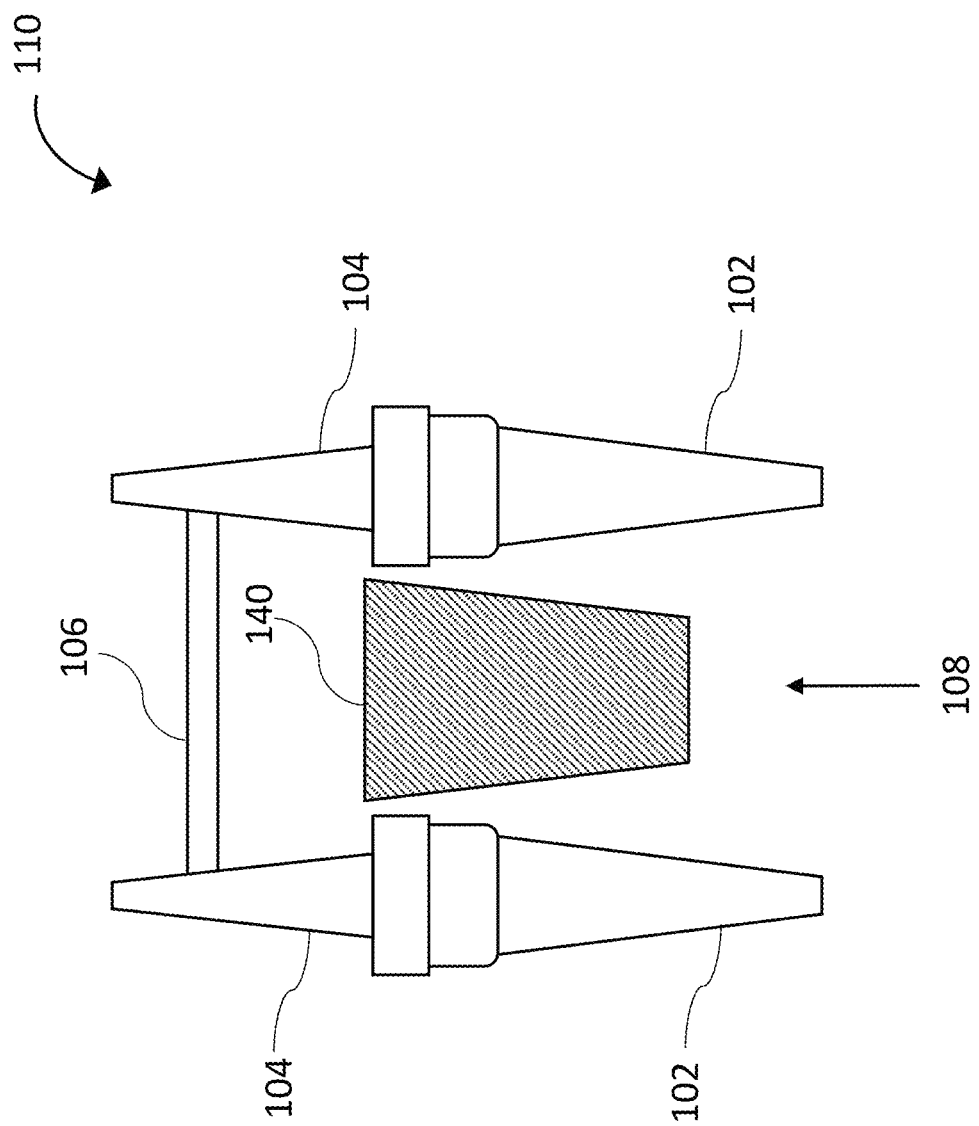
FIG. 2A illustrates a first exemplary base and container of a floating solar panel module, in accordance with some embodiments.

FIG. 2A depicts an exemplary embodiment of a base and container according to an embodiment. In some embodiments, base 110 may comprise two or more sections, such as hulls 102. Hulls 102 may be interconnected, e.g., alongside, in a spaced-apart arrangement, so as to create a space 108 therebetween for receiving a movable container, such as container 140 of FIG. 1A, in a way which permits movement of container 140 in a substantially vertical dimension.

In some embodiments, each hull 102 is configured for being buoyantly supported within a body of water. In some embodiments, a buoyancy level and stability properties of hulls 102 are determined, at least in part, based on at least one of the dimensions, volume, and footprint area of hulls 102. In some embodiments, hulls 102 combine a system of buoyancy and ballast, so as to achieve a desired floating elevation and orientation of hulls 102 relative to a surface level of the body of water, and to re-assume such desired floating elevation and orientation following a disruption, such as in strong winds and/or currents conditions. For example, hulls 102 may be hollow hulls configured for fully or partially filling with water, another liquid, or a solid matter to provide desired ballast. In other embodiments, hulls 102 may be solid, only partially hollow, or entirely hollow hulls.

In some embodiments, each of hulls 102 is configured to have a mounting arm 104 attached thereto about a top portion of each hull 102, using one or more fastening methods. In some embodiments, each hull 102 is integrally formed with a mounting arm 104. In some embodiments, two mounting arms 104, positioned each about a top portion of each hull 102, are configured for rigidly interconnecting to one another using, e.g., one or more interconnectors 106, so as to create a rigid base 110 comprising hulls 102 in a defined spaced-apart side-by-side arrangement, as described above. In some embodiments, and as described in greater detail elsewhere herein, one or more of the mounting arm 104 and the interconnectors 106 are integral with a seal of the base 102.

Figure 2B:
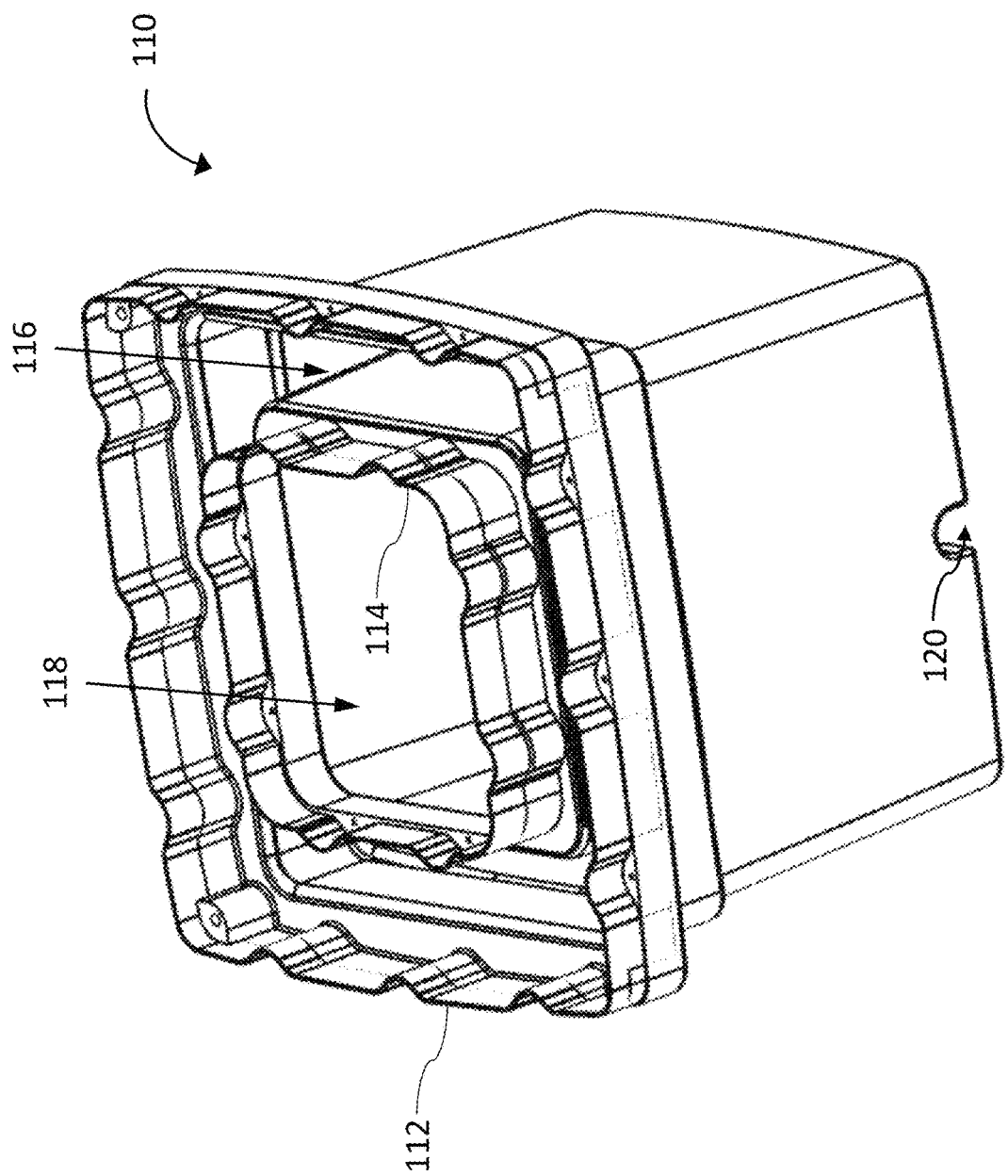
FIGS. 2B-2D illustrate a second exemplary base of a floating solar panel module, in accordance with some embodiments.
Figure 2C:
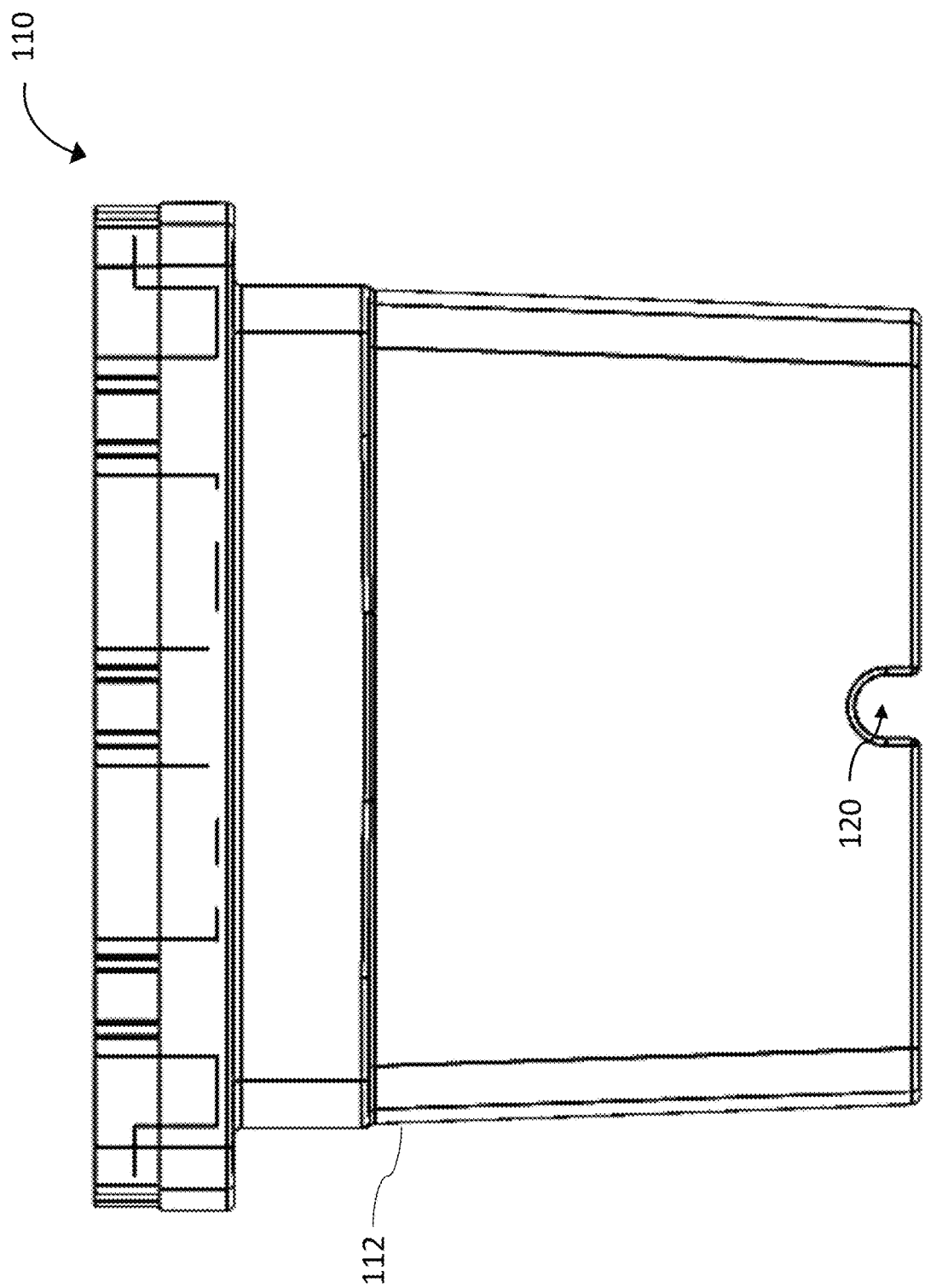
Figure 2D:
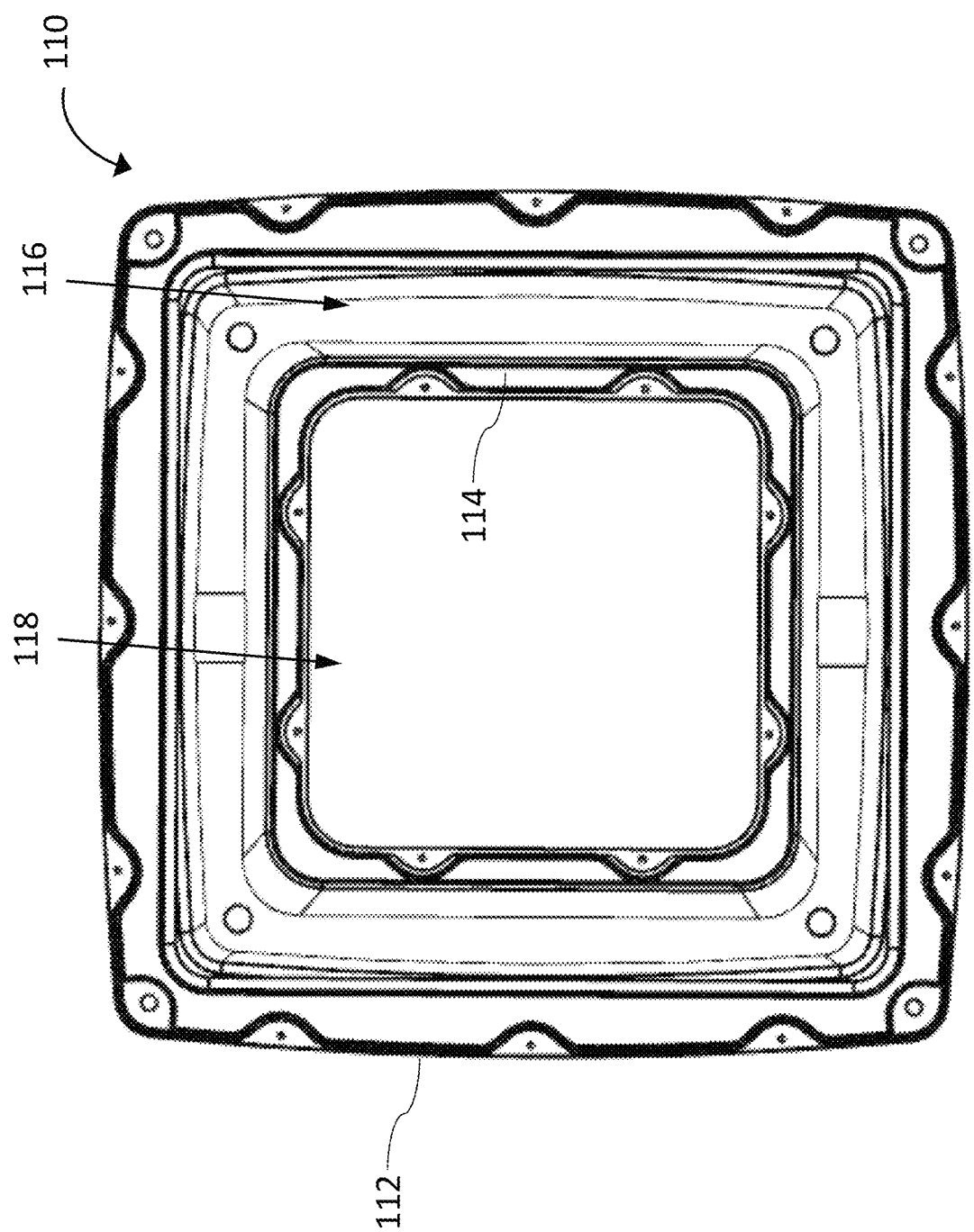
Figure 3A:
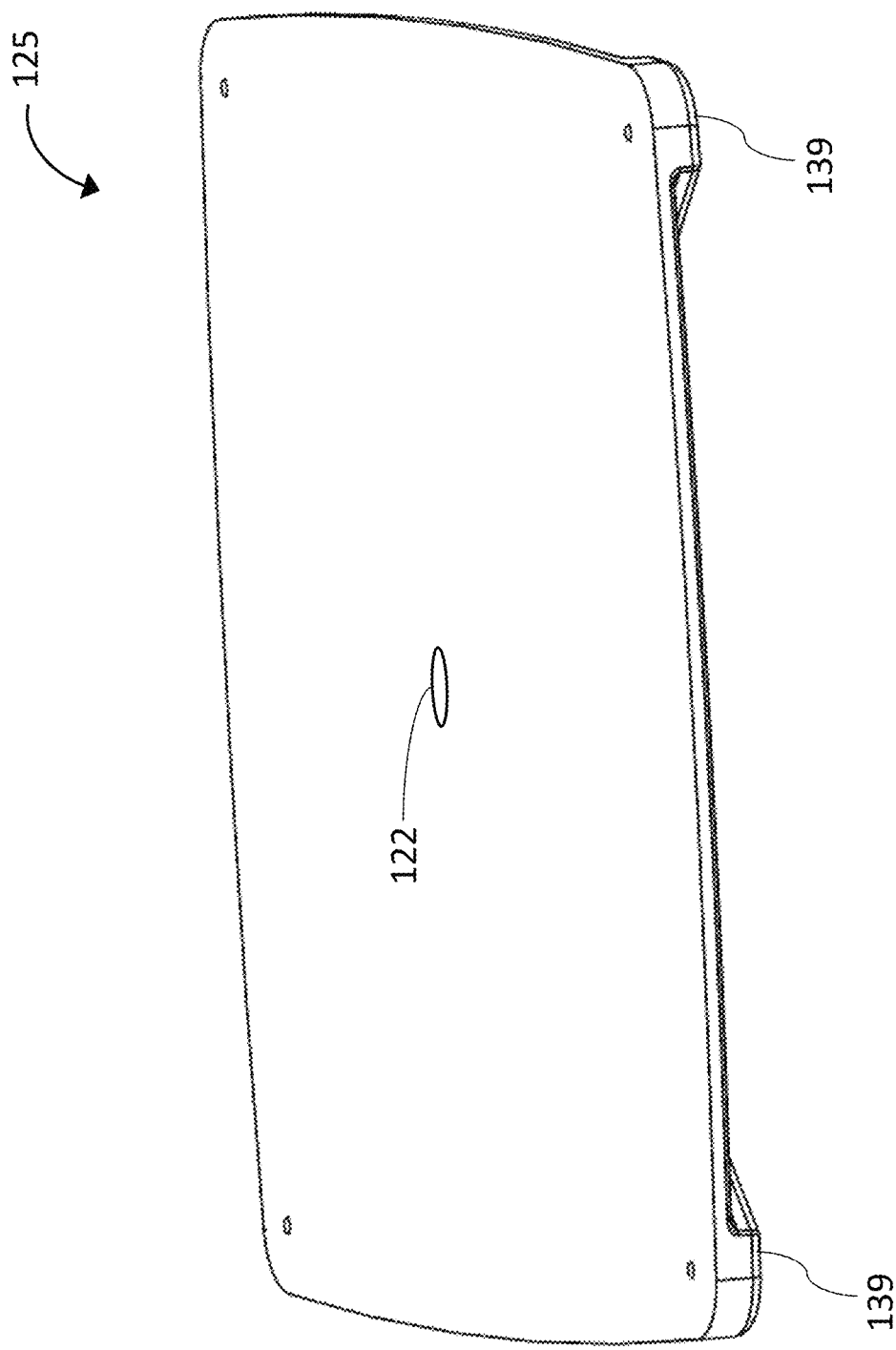
FIGS. 3A-3B illustrate an exemplary bottom closure for a base of a floating solar panel module, in accordance with some embodiments of the present invention.
Figure 3B:
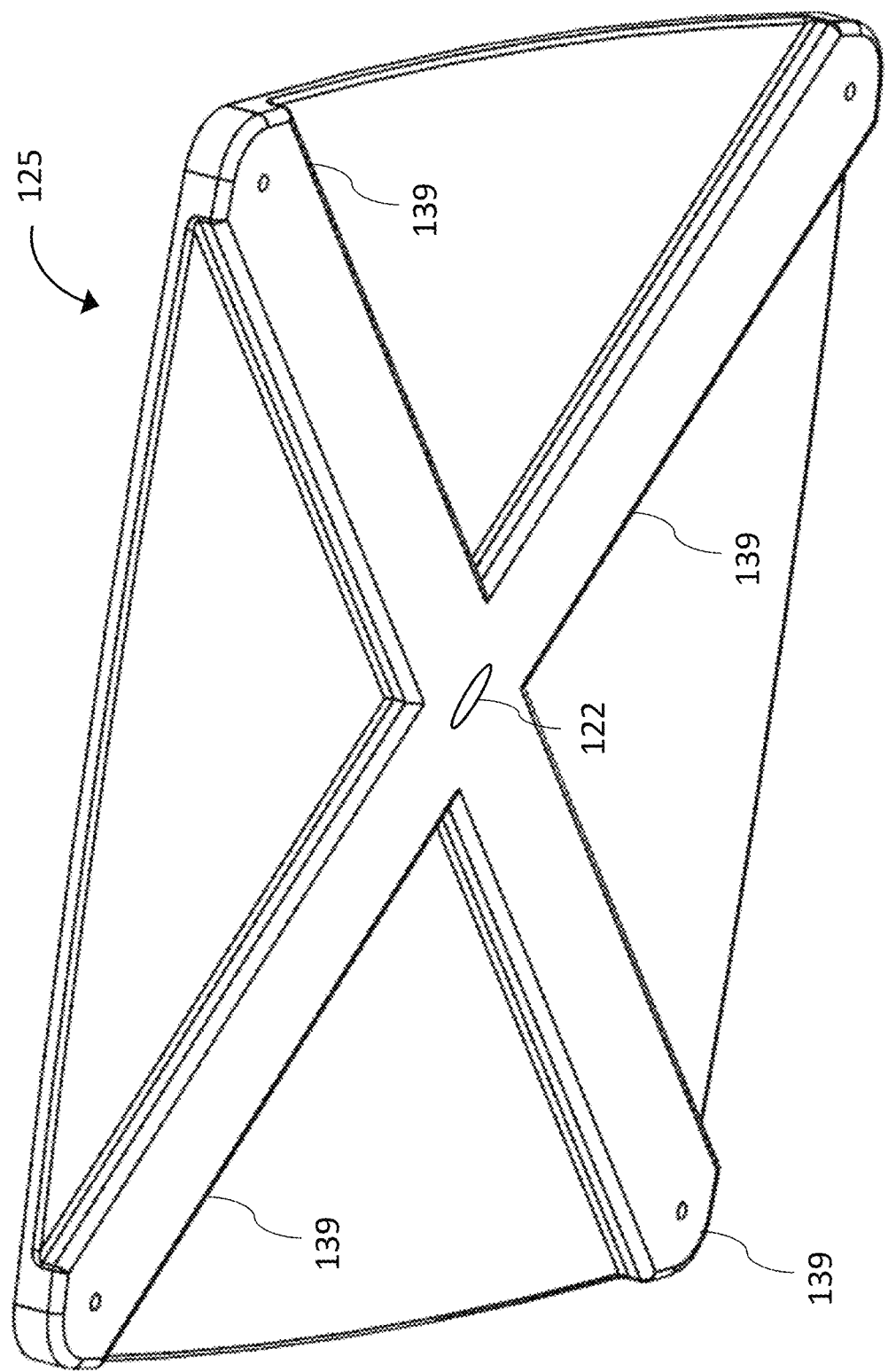

FIGS. 2B-2D illustrate another exemplary base 110 of the present invention, in perspective (FIG. 2B), side (FIG. 2C), and top (FIG. 2D) views. In some embodiments, base 110 defines a vessel having an interior chamber 118, and configured for being buoyantly supported within a body of water. In some embodiments, a buoyancy level and stability properties of base 110 are determined, at least in part, based on at least one of dimensions, volume, and footprint area of base 110. In some embodiments, base 110 combines a system of buoyancy and ballast, so as to achieve a desired floating elevation and orientation of base 110 relative to a surface level of the body of water, and to re-assume such desired floating elevation and orientation following a disruption, such as in strong winds and/or currents conditions.

In an exemplary embodiment, base 110 may comprise a double-walled construction comprising an outer wall 112 and an inner wall 114, wherein an interspace 116 between the outer and inner walls is configured for being at least partially flooded, so as to provide ballast to base 110. In other embodiments, base 110 may be provided with one or more additional and/or other types of ballast. Base 110 may be made of any suitable material, such as various types of polymers. In some embodiments, base 110 may be manufactured using such methods as injection molding, vacuum forming, and/or similar methods. In some embodiments, base 110 may be shaped to facilitate nesting or stacking, for ease of storage and transportation.

In some embodiments, and as described in greater detail elsewhere herein, the interior chamber 118 may be configured for being in fluid communication with the body of water outside of base 110, such that a water level within interior chamber 118 is substantially determined by the surface level of the body of water.

In some embodiments, base 110 may define an open-bottomed vessel, wherein a bottom opening of base/vessel 110 may be covered with a closure. FIGS. 3A-3D illustrate an exemplary bottom closure 125 configured for covering a bottom portion of base 110, in top perspective (FIG. 3A) and bottom perspective (FIG. 3B) views. In some embodiments, the bottom closure 125 comprises one or more raised supports 139 configured to fit within the base 110. In some embodiments, and as described in greater detail elsewhere herein, the bottom closure 125 may comprise an opening, such as opening 122, configured for permitting fluid communication between interior chamber 118 and the body of water.

FIGS. 4A-4D illustrate an exemplary mount 130, in top perspective (FIG. 4A), bottom perspective (FIG. 4B), and side (FIG. 4C) views. In some embodiments, mount 130 may be configured for attaching to a top portion of base 110, e.g., using a plurality of fasteners. In some embodiments, mount 130 connects to base 110 in a sealing engagement, wherein the connection provides a seal against the egress of liquids into the interior of base 110. In some embodiments, mount 130 comprises one or more support posts 132 configured for pivotably mounting a solar panel support frame, such as support frame 170 in FIGS. 1A and 1D.

Figure 4A:
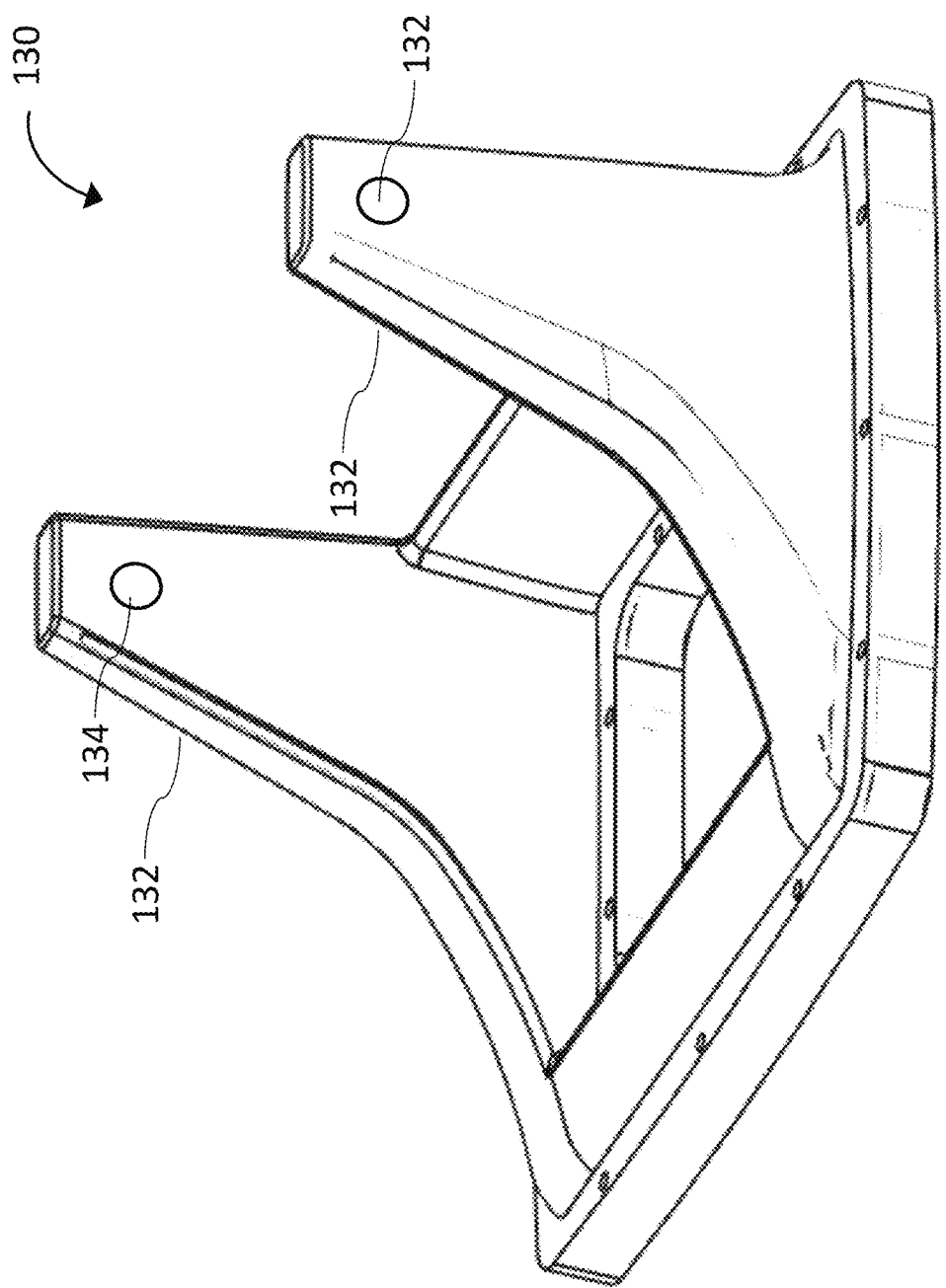
FIGS. 4A-4D illustrate exemplary mounts, in accordance with some embodiments of the present invention.
Figure 4B:
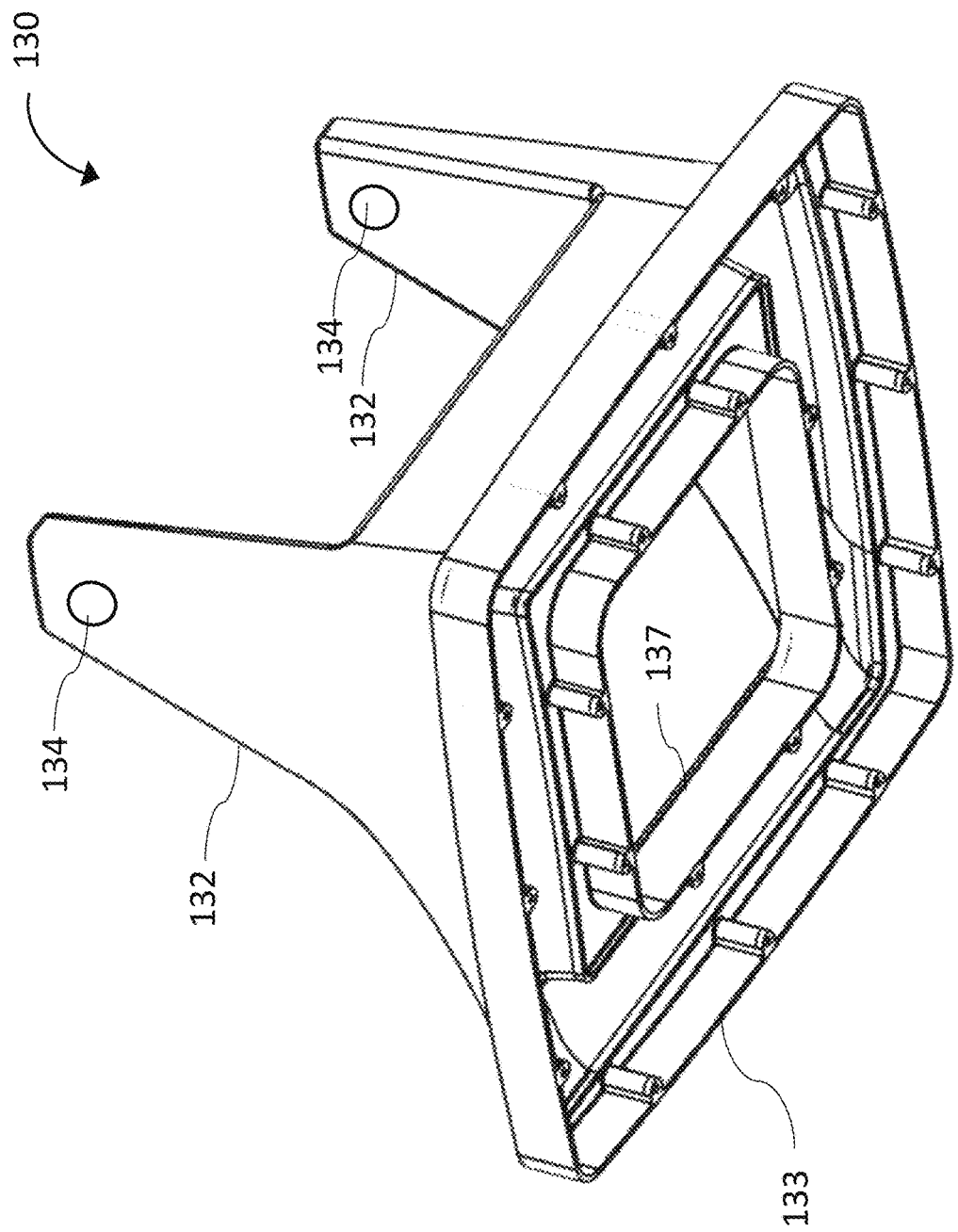
Figure 4C:
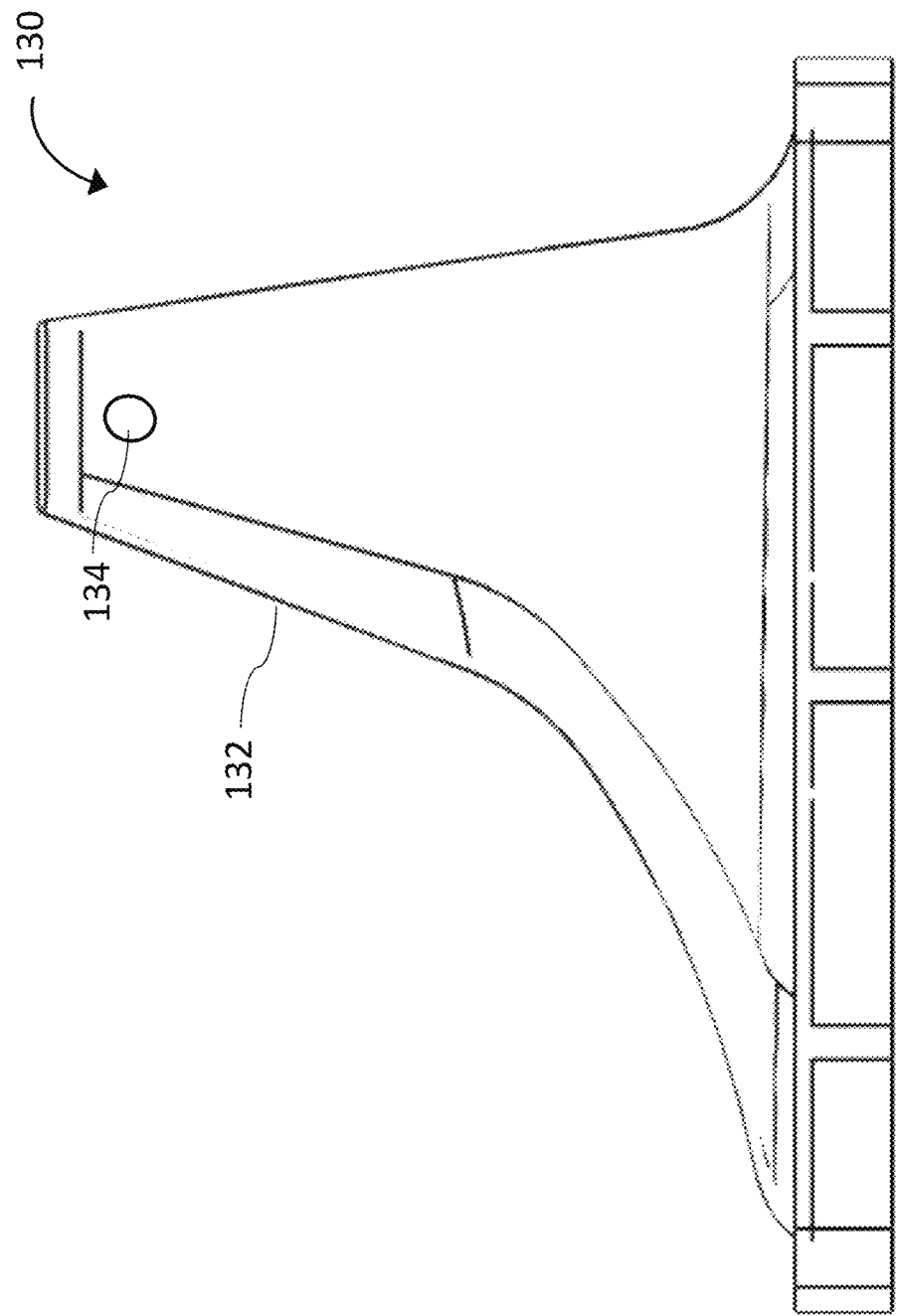
Figure 4D:
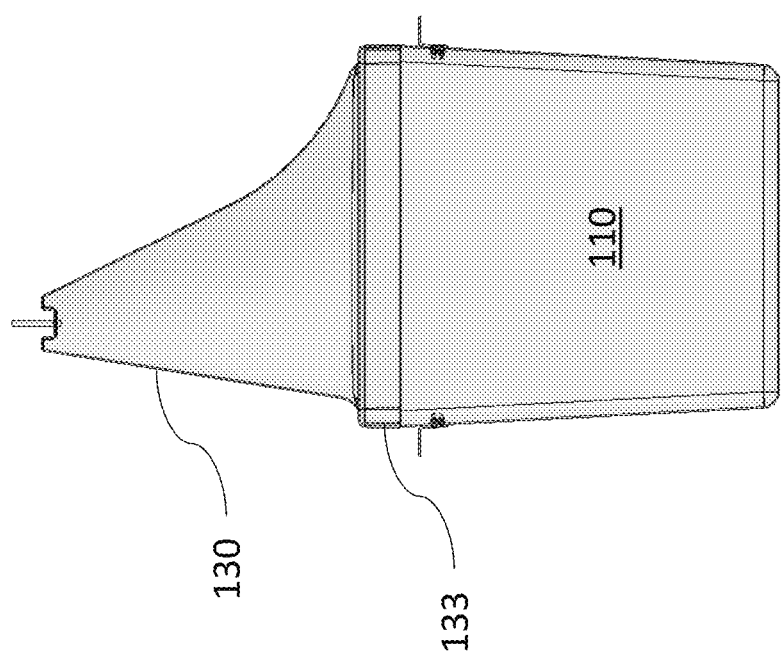

In some embodiments, for example, as depicted by FIGS. 4B, 4C, and 4D, the mount 130 is configured to seal the base 110 and/or hulls 102. In some embodiments, the mount 130 comprises a shoulder 133 configured to fix onto the base 110 and/or hulls 102. In some embodiments, the mount 130 comprises an opening 137 sized to fit the container 140. In some embodiments, the container 140 is moveable through the opening 137 of the mount 130.

Typically, solar panels are constructed similarly to a picture in a frame, with the solar cells being laminated between a transparent front cover and a protective back layer, where the laminate is being mounted within a surrounding rectangular and substantially flat metal frame. Accordingly, in some embodiments, solar panels 160 may be mounted to such a support frame 170, shown in FIGS. 1A-1D.

Figure 5A:
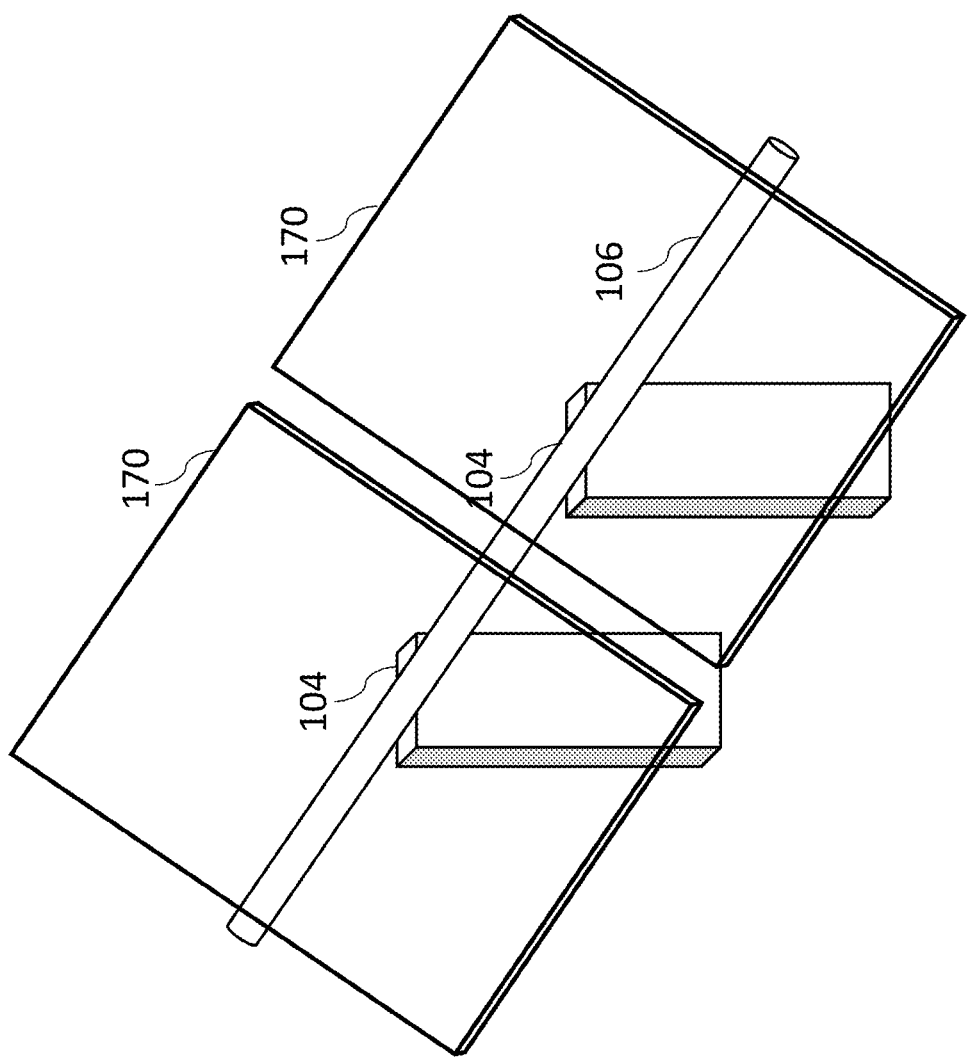
FIGS. 5A-5B are schematic illustrations of an exemplary solar panel support frame, in accordance with some embodiments of the present invention.
Figure 5B:
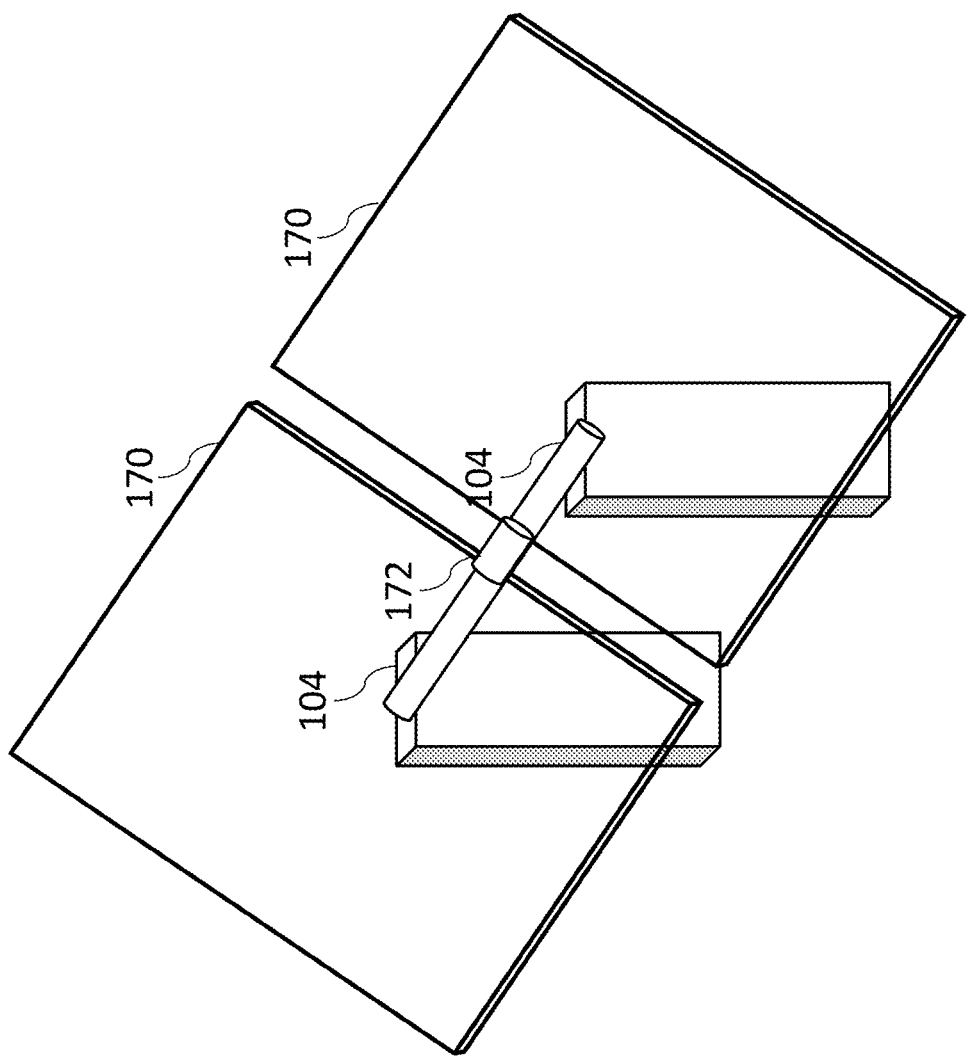
Figure 6A:
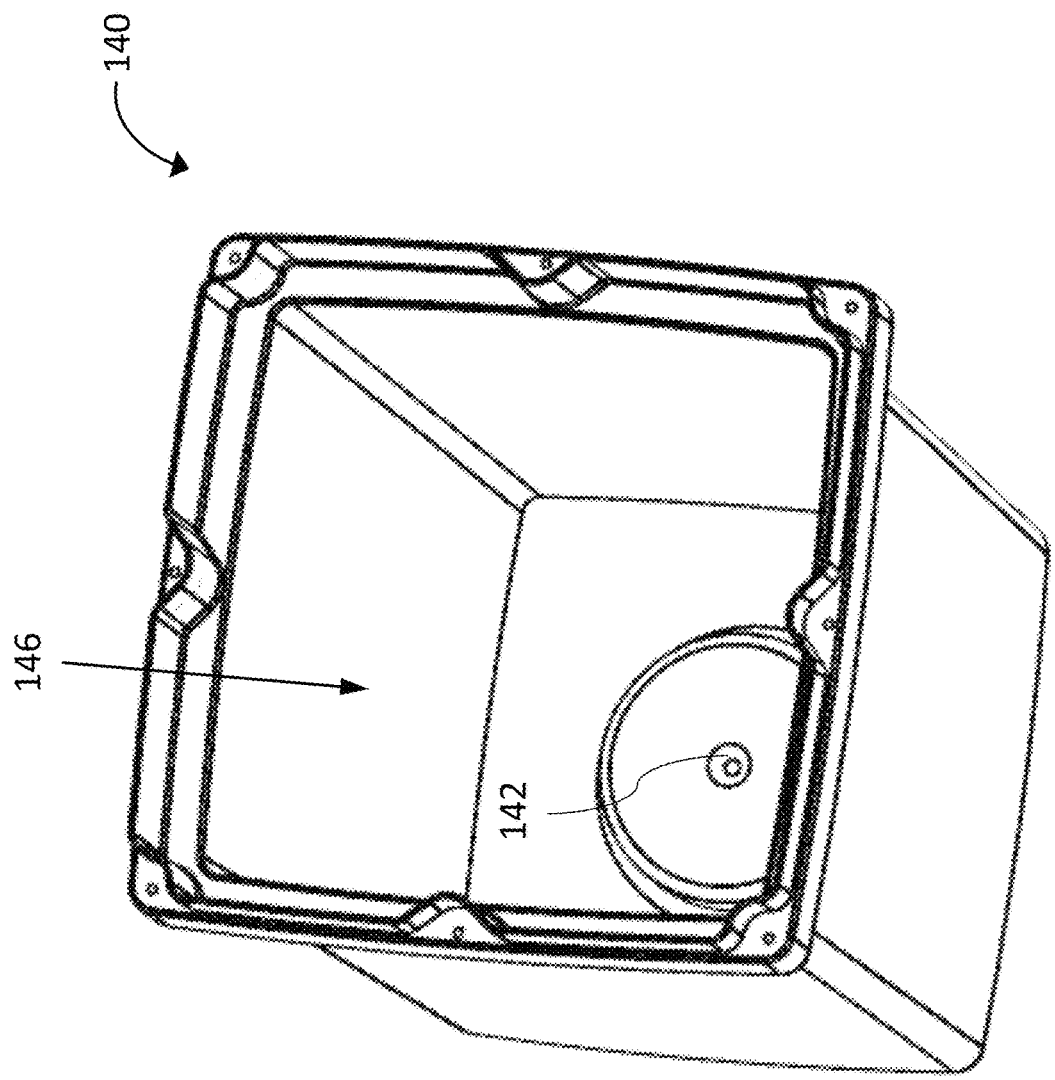
FIGS. 6A-6D show an exemplary container, in accordance with some embodiments of the present invention.
Figure 6B:
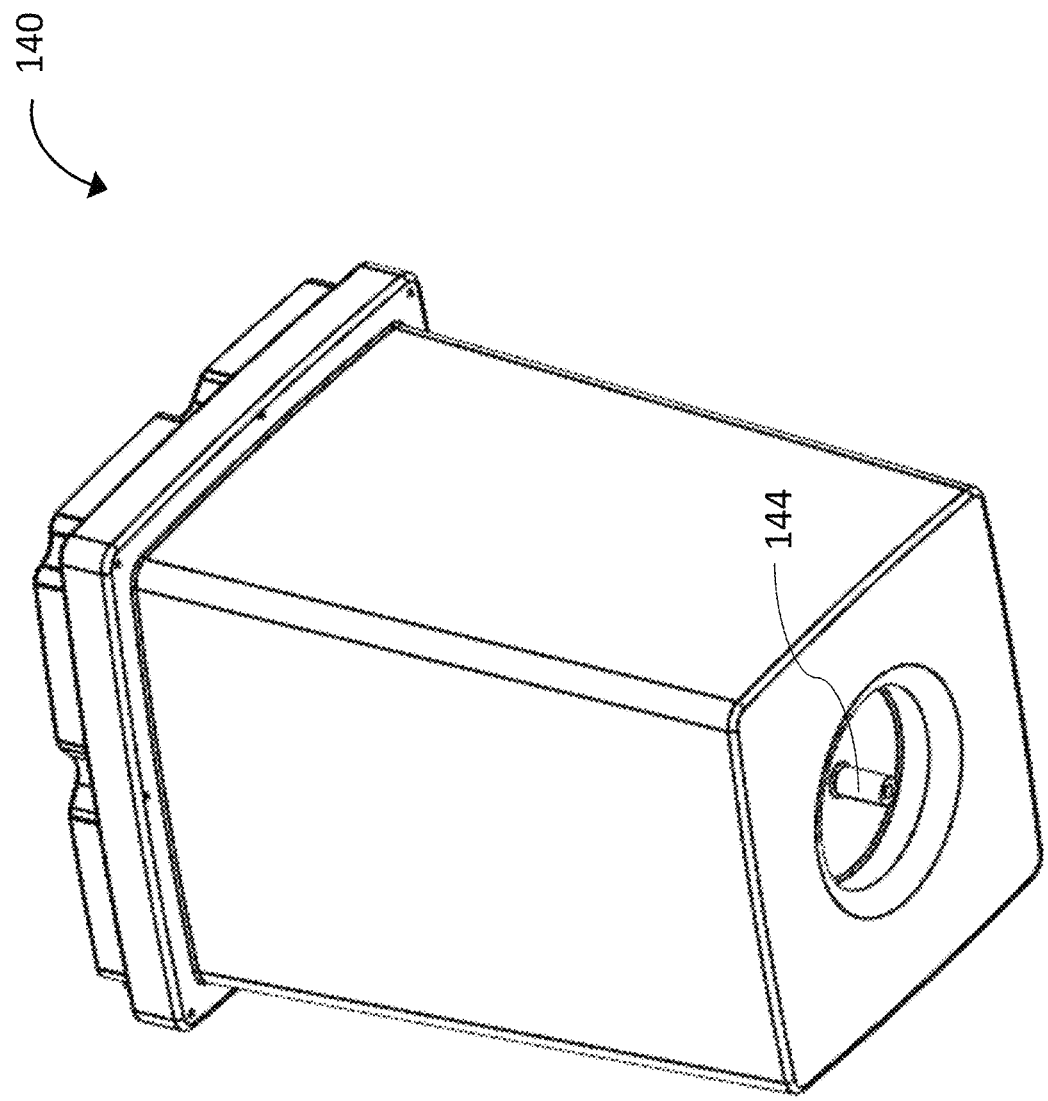
Figure 6C:
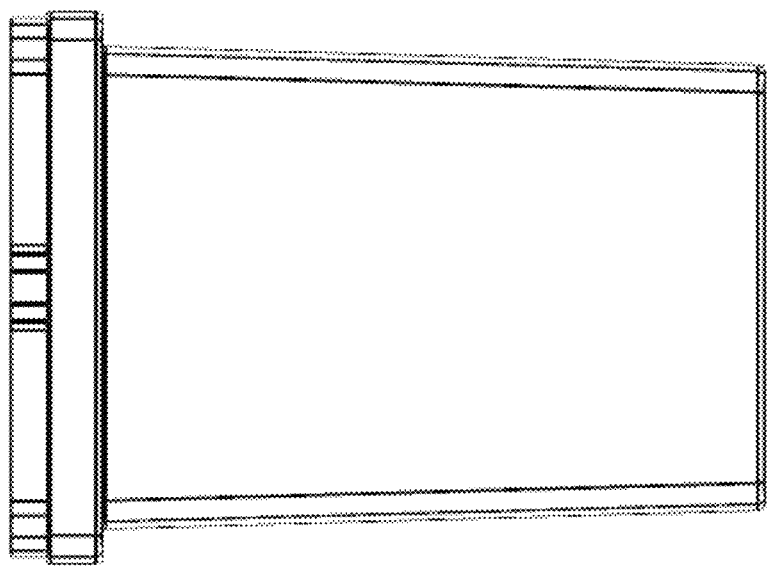
Figure 6D:
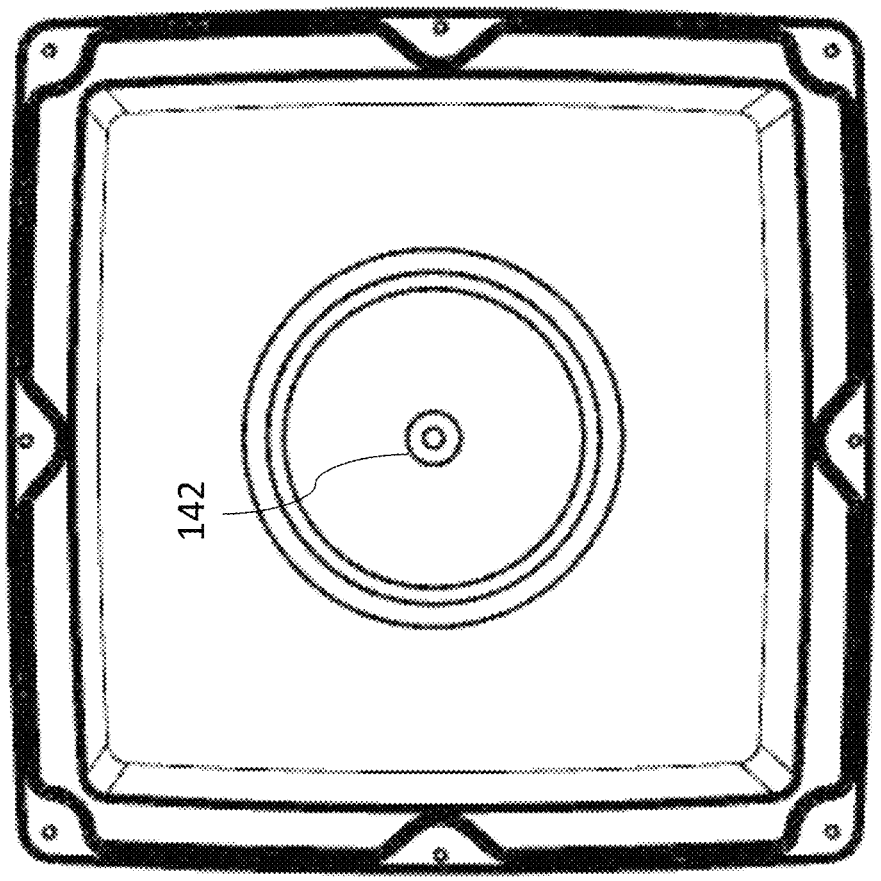

FIGS. 5A-5B are schematic illustrations of an exemplary solar panel support frame 170 which may be used in conjunction with the present invention.

In some embodiments, such as depicted in FIG. 5A, movement of the frame 170 changes the forces that are applied to the axis 172 by the weight of the panels and frame 170. In some embodiments, the center of gravity of the frame 170 and/or the panels is adjustable in relation to the pivot. In some embodiments, adjusting the center of gravity about the pivot, for example, as depicted in 5B eliminates the dynamically interrupting forces.

In some embodiments, the support frame 170 may comprise a horizontal longitudinal shaft which may provide a pivot point along, e.g., a central longitudinal axis of support frame 170. In some embodiments, the pivot point comprises an axis of rotation about which the frame 170 rotates. In some embodiments, movement of the support frame 170 changes the position of the center of gravity of the support frame 170 relative to module 100. In some embodiments, the center of gravity of the support frame 170 is adjustable in relation to the pivot.

A potential advantage of the center of gravity of the support frame 170 and/or panels being adjustable is in that the center of gravity can be adjusted such that one or more external forces applied to the support frame 170 ad/or panels can by partially and/or fully countered by the center of gravity of the support frame 170 ad/or panels. In some embodiments, the center of gravity of the support frame 170 and/or panels is adjusted by taking into account the external forces acting on the support frame 170 ad/or panels.

In some embodiments, support frame 170 may be pivotably mounted to a mount, such as mount 130 of FIG. 1A, or mounting arms 104. In some embodiments, a pivot point about which support frame 170 pivots may be located on a same plane as the support frame 170. In some embodiments, a pivot point about which support frame 170 pivots may be located below a plane of support frame 170. In other embodiments, the pivot point may be located above the plane of support frame 170, so as to lower a center of gravity of support frame 170, thereby creating a self-centering effect about axis 172.

A potential advantage of the pivot point having a same height as the center of gravity of support frame 170, is in the elimination of dynamical moments, caused by the weight of the support frame 170, applied to the pivot point, in relation to similar forces applied onto a pivot point not aligned with the support frame 170.

FIGS. 6A-6D shows an exemplary container 140 of the present invention, in top perspective (FIG. 6A), bottom perspective (FIG. 6B), side (FIG. 6C), and top (FIG. 6D) views. In some embodiments, container 140 defines a receptacle for fluids, dimensioned for being received within interior chamber 118 (FIG. 2B) or space 108 (FIG. 2A) of base 110, and for slidingly moving in the vertical dimension relative to base 110.

Figure 7B:
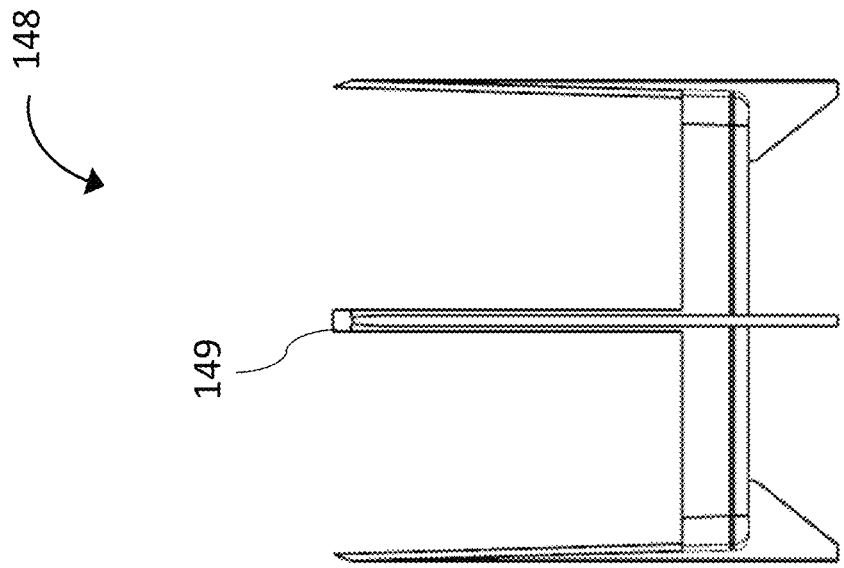
FIGS. 7A-7C show a container guide for facilitating movement of a container, in accordance with some embodiments of the present invention.
Figure 7A:
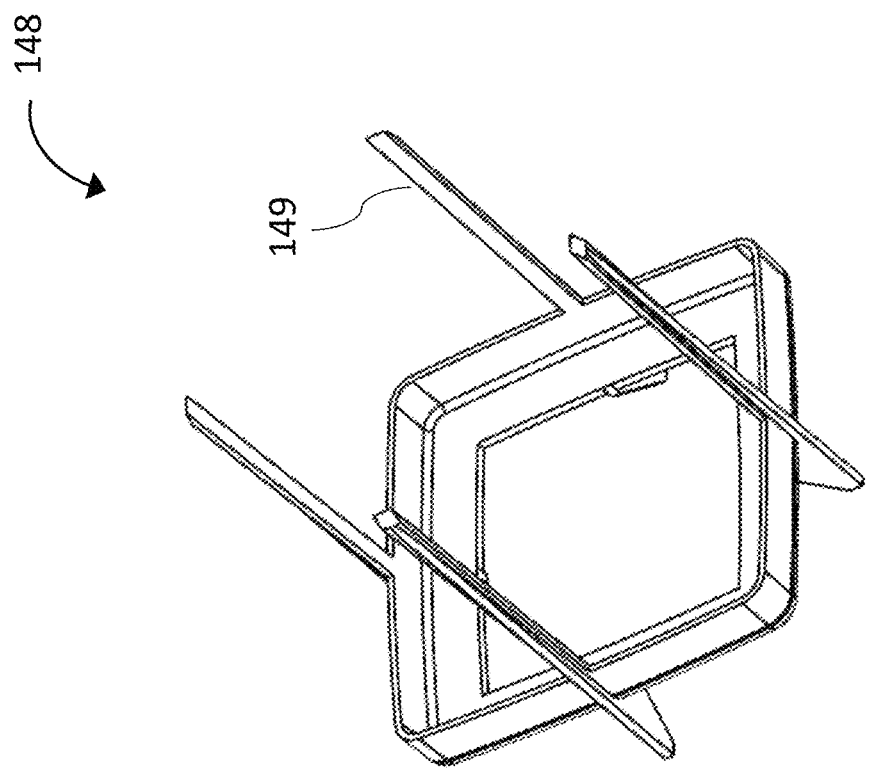
Figure 7C:
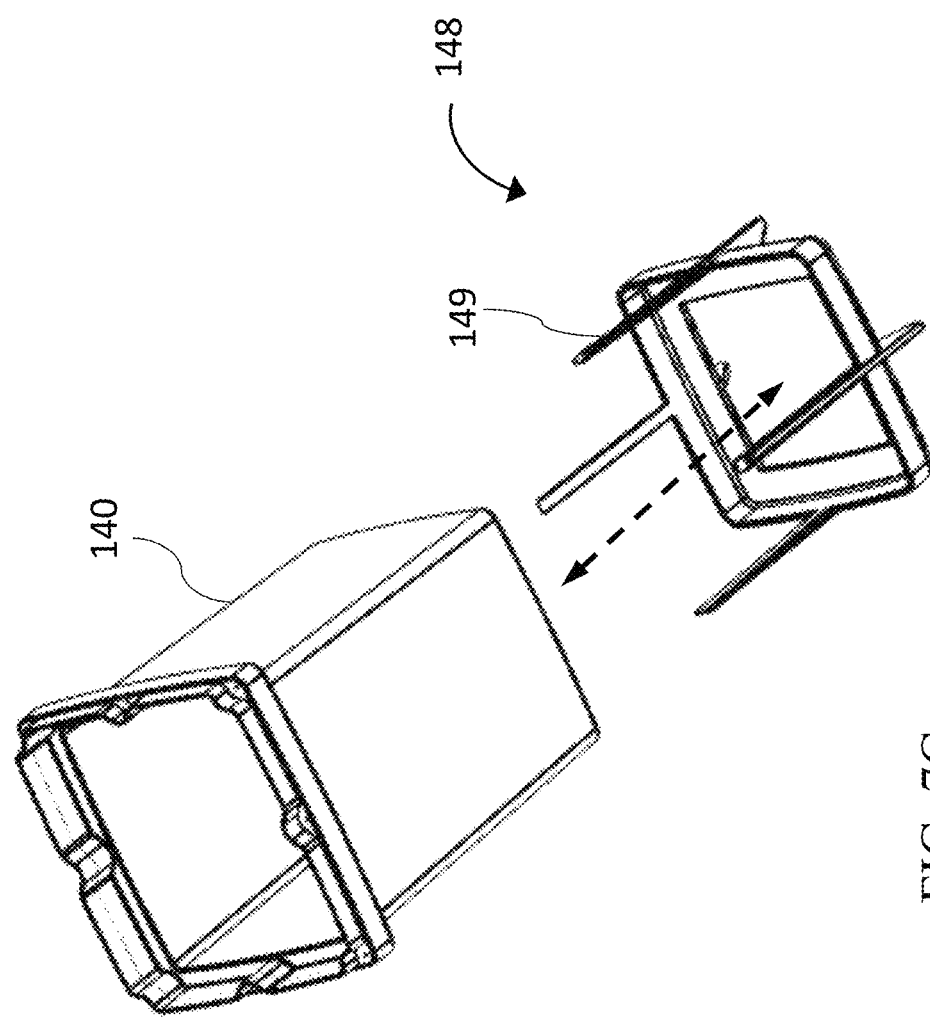

FIGS. 7A-7C illustrate an exemplary container guide 148 which may be attached to container 140 and slide against the interior wall 114 of base 110 and configured for aligning and facilitating the vertical movement of container 140 within interior chamber 118. In some embodiments, container guide 148 may comprise a plurality of slide rails 149, e.g., between 2 and 6 slide rails 149, defining a receiving space of container 140 and facilitating the controlled vertical movement of container 140 under the guidance of, e.g., one or more receiving vertical slot in an internal wall of base 110.

With reference back to FIGS. 6A-6D, in some embodiments, container 140 may be configured for being emptied and/or filled with fluid, such as water, from a remote location, via opening 142 in container 140. In some embodiments, opening 142 may comprise a spout 144 (seen in FIG. 6B). Container 140 may be made of any suitable material, such as various types of polymers. In some embodiments, container 140 may be manufactured using such method as injection molding, vacuum forming, and/or similar method. In some embodiments, container 140 may be shaped to facilitate nesting or stacking, for ease of storage and/or shipment.

In some embodiments, opening 142 can be positioned on any one or more of the walls of the container 140. In some embodiments, fluid is filled and/or emptied from the container 140 through any one or more of the side walls, the top portion of the container 140, and the bottom portion of the container 140, using a flexible pipe with its end fastened to the container 140 bottom.

As noted above, interior chamber 118 of base 110 is in fluid communication with the body of water surrounding base 110, such that a fluid level within interior chamber 118 is substantially equal to the surface level of the body of water. In the case of multi-sectional base 110 seen in FIG. 2A, space 108 is located within the surrounding body of water.

Accordingly, container 140, in some embodiments, is configured for being buoyantly supported within interior chamber 118 or space 108, as the case may be, wherein a buoyancy height of container 140 may be determined by a fluid level within container 140. In some embodiments, by changing the fluid level within container 140, the buoyancy height of container 140 may be adjusted. In some embodiments, container 140 may slidingly move within interior chamber 118 or space 108, as the case may be, such that, at its highest position, a top portion of container 140 may extend above a top portion of base 110.

Figure 8A:
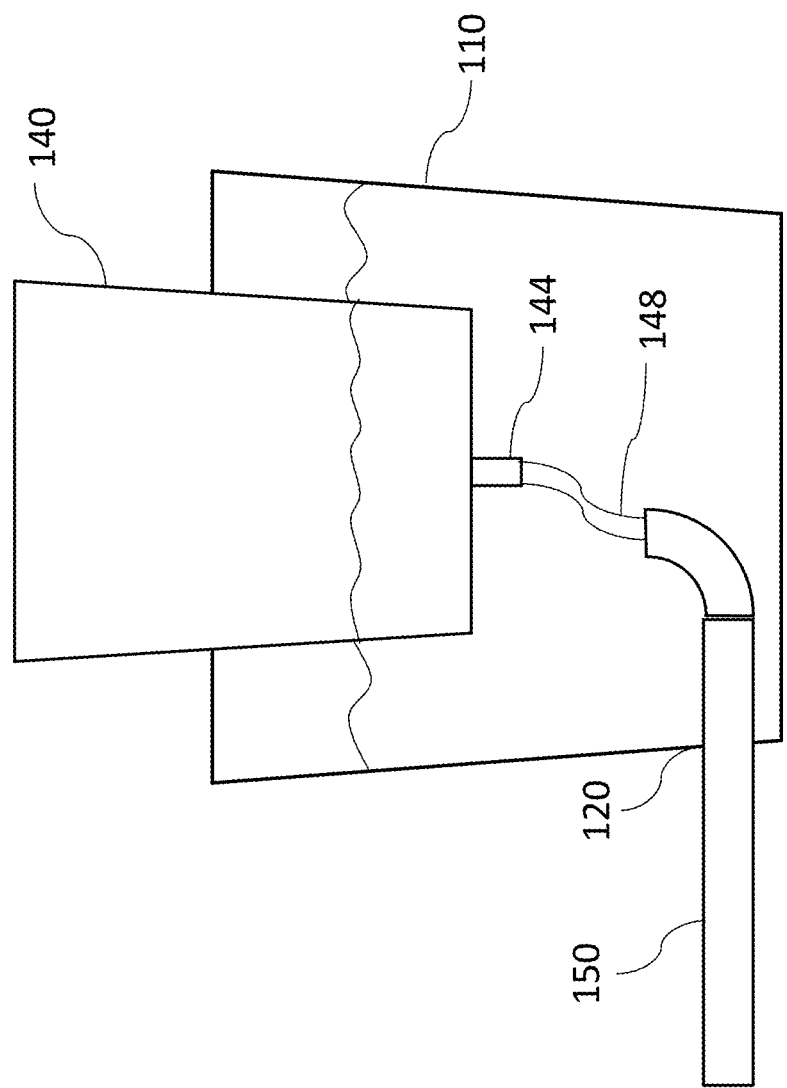
FIGS. 8A-8B schematically illustrate selective adjustment of fluid level within a container, in accordance with some embodiments of the present invention.
Figure 8B:
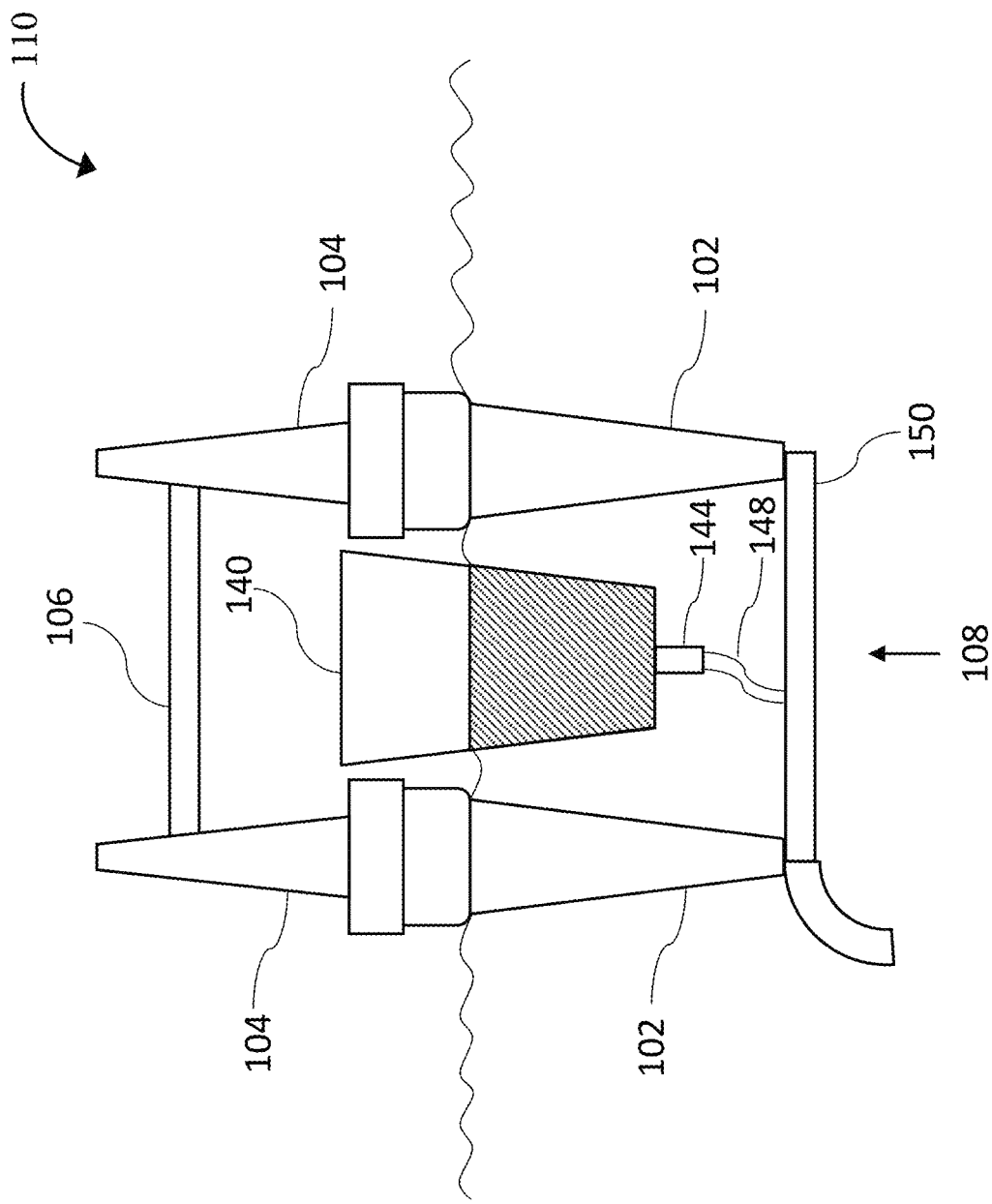

FIGS. 8A-8B schematically illustrate selective adjustment of a fluid level within container 140, within the context of a base 110 having a chamber 118 (FIG. 8A) or space 108 (FIG. 8B). In some embodiments, spout 144 may be connected to a fluid conduit feeding system comprising, e.g., rigid pipe 150 configured for supplying fluid from a remote location. A terminal of rigid pipe 150 may be inserted into base 110 through opening 120 (also shown in FIGS. 1A, 1C, 1D and 2A). Within base 110, rigid pipe 150 may be connected to flexible section 148 configured for supplying fluid to container 140 while permitting vertical movement of container 140 relative to base 110. Fluid volume supplied or removed from container 140 via rigid pipe 150 determines the level of fluid inside container 140 and affects the buoyancy of container 140 within base 110. Controlled flow of the fluid volume into and out of container 140 controllably affects the buoyancy of container 140 bringing controllable vertical movement of container 140 relative to base 110 as shown in FIGS. 9A and 9B.

Figure 9A:
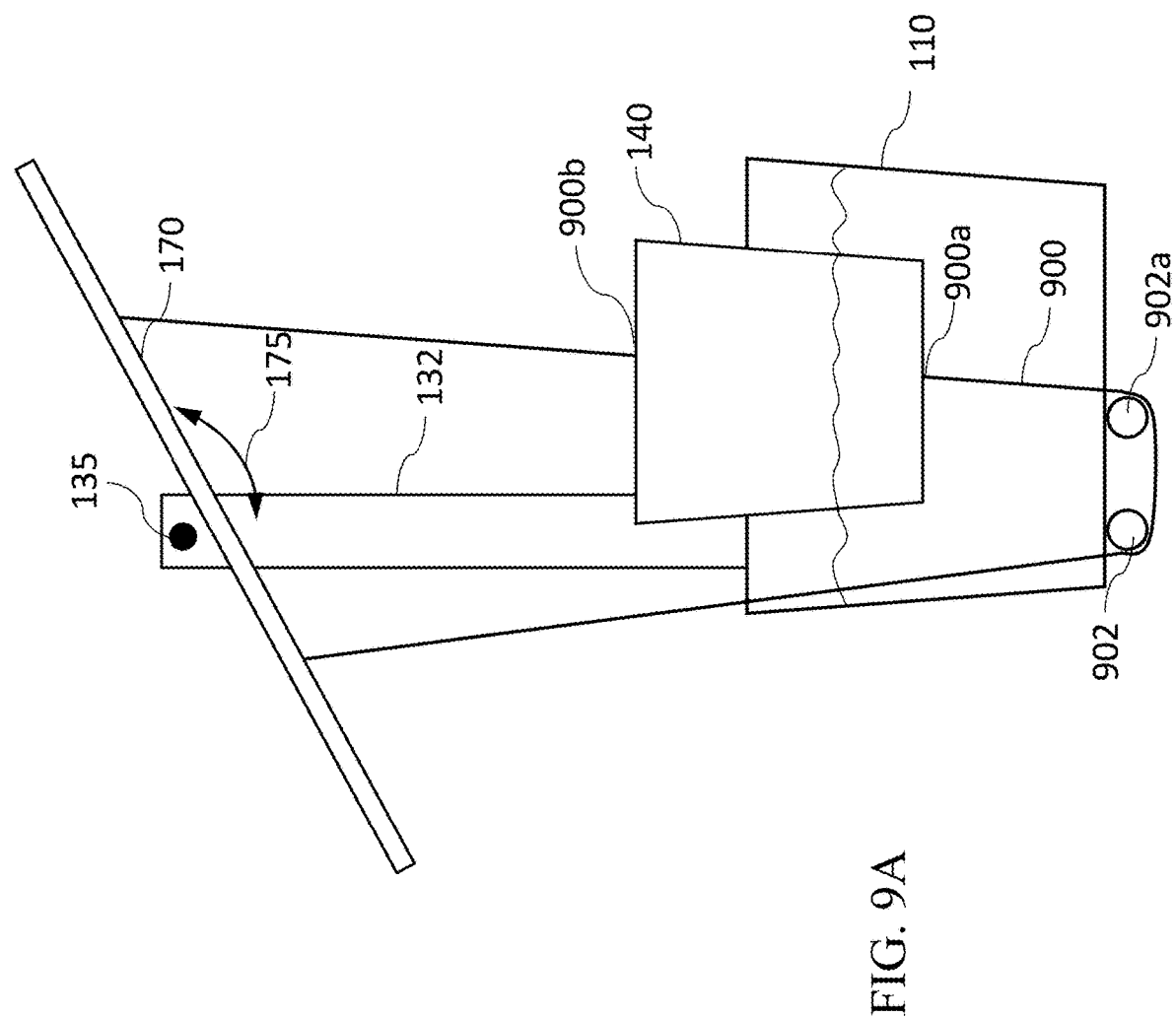
FIGS. 9A-9D schematically illustrate exemplary tilt mechanisms, in accordance with some embodiments of the present invention.
Figure 9C:
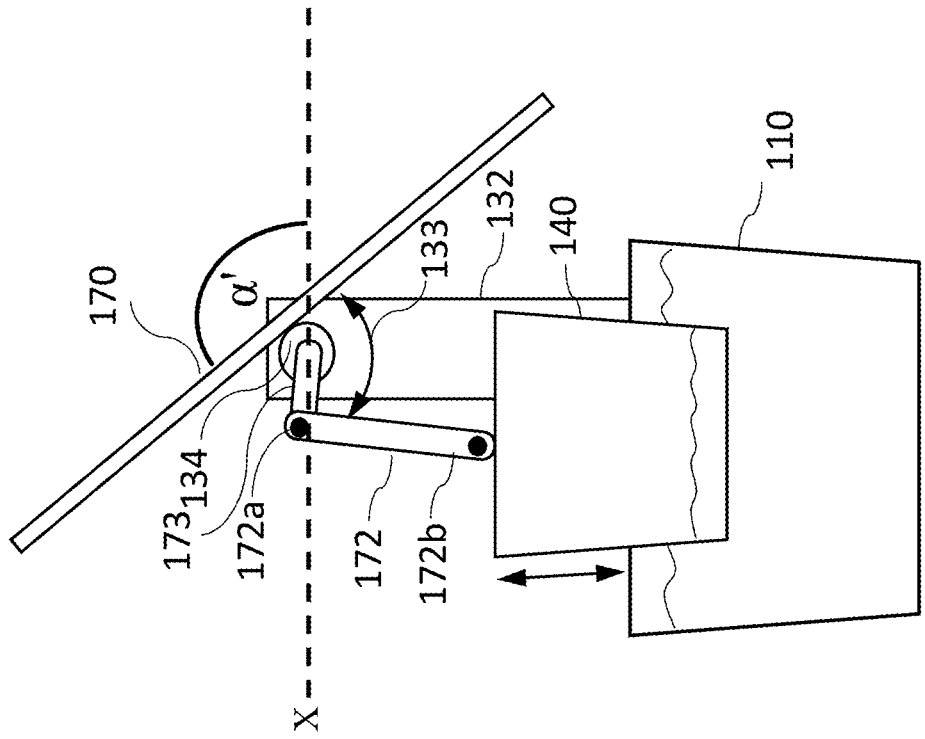
Figure 9B:
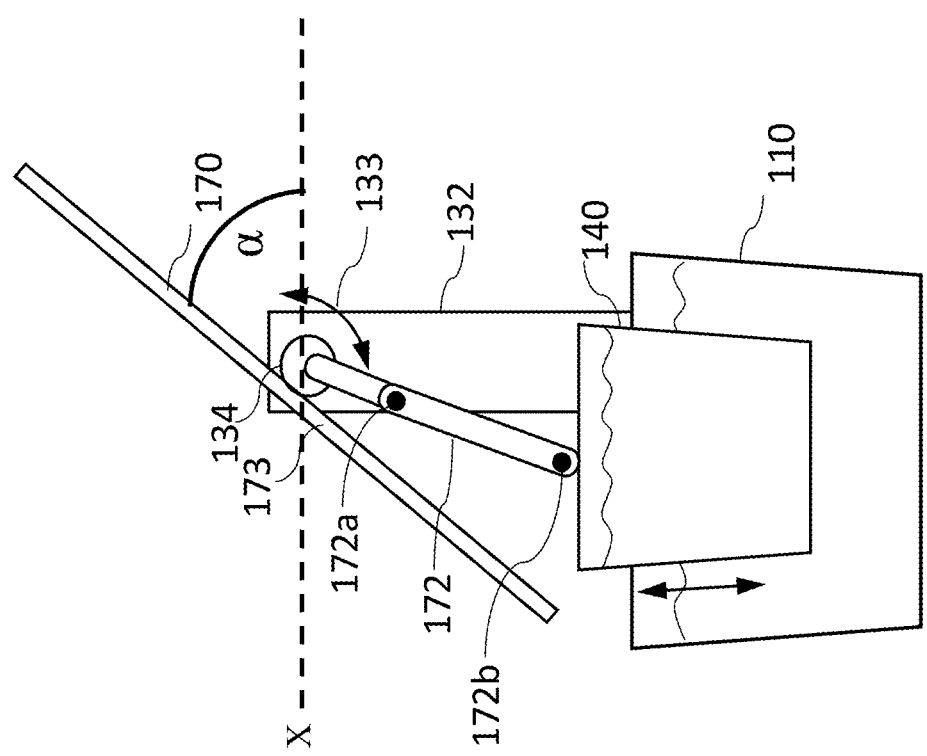

FIGS. 9A-9B schematically illustrate an exemplary tilt mechanism configured for translating a vertical motion of container 140 into changes in the tilt angle of support frame 170. In FIG. 9B, container 140 is maximally filled up with fluid, and consequently its buoyancy level relative to base 110 is at its lowest level, which translates into a maximal tilt angle in a first direction relative to the horizontal. In FIG. 9C, container 140 is minimally filled up with fluid, and consequently its buoyancy level relative to base 110 is at its highest level, which translates into a maximal tilt angle in an opposite direction relative to the horizontal. Accordingly, by controlling the fluid level in container 140, all tilt angles can be achieved within this range.

In some embodiments, a tilt mechanism of the present invention may be configured for tilting support frame 170, from 0° up to between 25° and 75° on either side, for example, e.g. front and back of module 100, relative to the horizontal. In some embodiments, such tilting of the support frame 170, from 0° up to between 25° and 75°, is done on one side only—e.g. front or back of module 100.

FIG. 9A schematically illustrates an exemplary embodiment of a cable-and-pulley tilt mechanism. A cable 900 is connected to container 140 at an upper and lower points 900a, 900b, and to support frame 170 at two opposing points on either side of pivot point 135. Cable 900 is then routed at a bottom area of base 110 through pulleys, e.g., pulleys 902a, 902b. Thus, an upward vertical movement of container 140 exerts a pull force on cable 900 through connecting point 900a, whereas a downward movement of container 140 exerts an opposite pull force on cable 900 through connecting point 900b. In either case, the pull force exerted in either way with respect to cable 900 is translated into a pivoting movement of support frame 170. Because the cable/pulley arrangement translates the vertical movement of container 140 into a pull force, the translation into pivoting movement is expected to be smoother and with less mechanical slack and free-play. In some embodiments, the container 140 may be located substantially above pulley 902a, to ensure a smooth operation and a self-centering force.

In some embodiments, another exemplary tilt mechanism shown in FIGS. 9B-9C may comprise a crank-like arrangement comprising a tilt crank bracket 173 coupled to support frame 170, and a link rod 172 connected to crank bracket 173 at a first pivot point 172a and to container 140 at a second pivot point 172b.

Figure 9D:
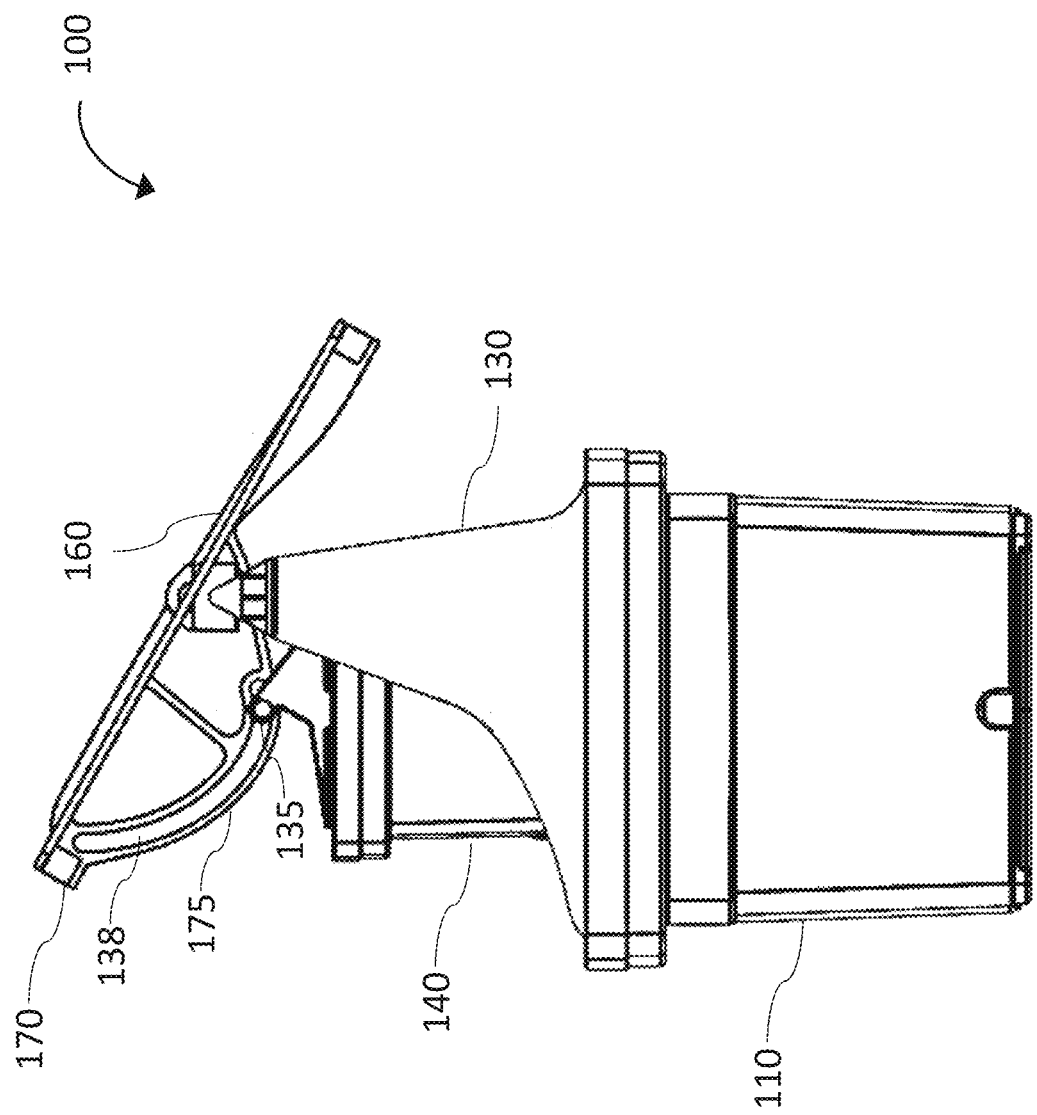

FIG. 9D illustrates another exemplary embodiment of a tilt mechanism which may be used to translate the vertical motion of container 140 into rotational motion of support frame 170. For example, support frame 170 may comprise one or more brackets 175 comprising an arcuate guide slot 138, wherein container 140 may be operationally connected to a guide pin 135 fitted within the guide slot 138. In some embodiments, the movement in the vertical dimension of container 140 is thus translated into angular movement of frame 170. In some embodiments, the tilt mechanism comprises a push-pull mechanism of a rod coupled to one or more of the containers 140 and the support frame 170. In some embodiments, pushing and/or pulling the rod changed the position of the frame 170 in relation to the container 140.

In some embodiments, the interior chamber 118 may be configured for being in fluid communication with the body of water outside of base 110, such that a water level within interior chamber 118 is substantially determined by the surface level of the body of water. In some embodiments, fluid communication for interior chamber 118 may be provided by, e.g., one or more openings on the side and/or bottom areas of interior chamber 118. In some embodiments, such openings may be dimensioned so as to provide for a controlled fluid flow between interior chamber 118 and the body of water, so as to avoid any abrupt fluid level changes within interior chamber 118, which may affect a tilt angle of the solar panel, as explained in greater detail elsewhere herein. In some embodiments, one or more of these openings may comprise a control valve and/or a similar device to provide for controlled fluid communication with the body of water.

In some embodiments, base 110 may define an open-bottomed vessel, wherein a bottom opening of base/vessel 110 may be covered with a closure. In some embodiments, the bottom closure 125 comprises one or more raised supports 139 configured to fit within the base 110.

In some embodiments, bottom closure 125 may comprise an opening, such as opening 122, configured for permitting fluid communication between interior chamber 118 and the body of water. In some embodiments, opening 122 may be dimensioned so as to provide for a controlled fluid flow between interior chamber 118 and the body of water, so as to avoid any abrupt fluid level changes within interior chamber 118. In some embodiments, the bottom closure 125 may comprise a control valve and/or a similar device in fluid communication with the body of water.

Figure 10A:
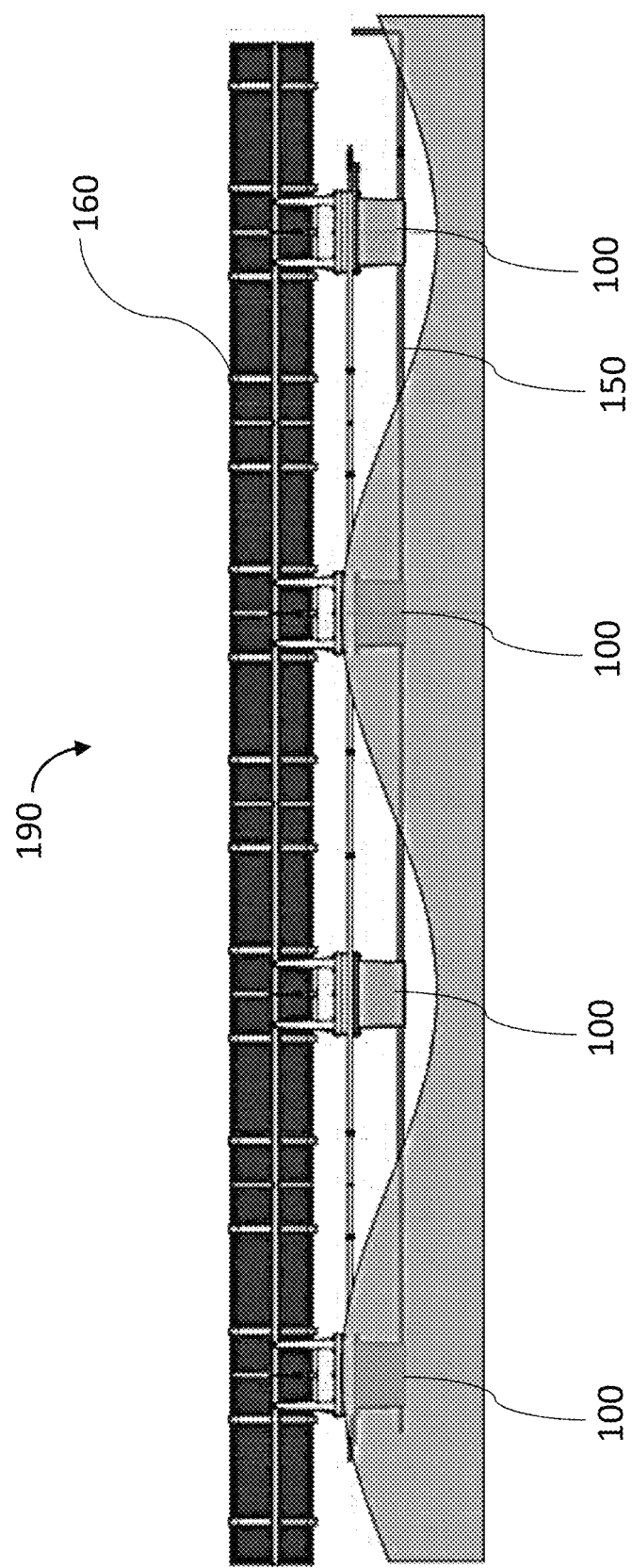
FIGS. 10A-10D illustrate a system comprising an array field of floating solar panel modules, in accordance with some embodiments of the present invention.
Figure 10B:
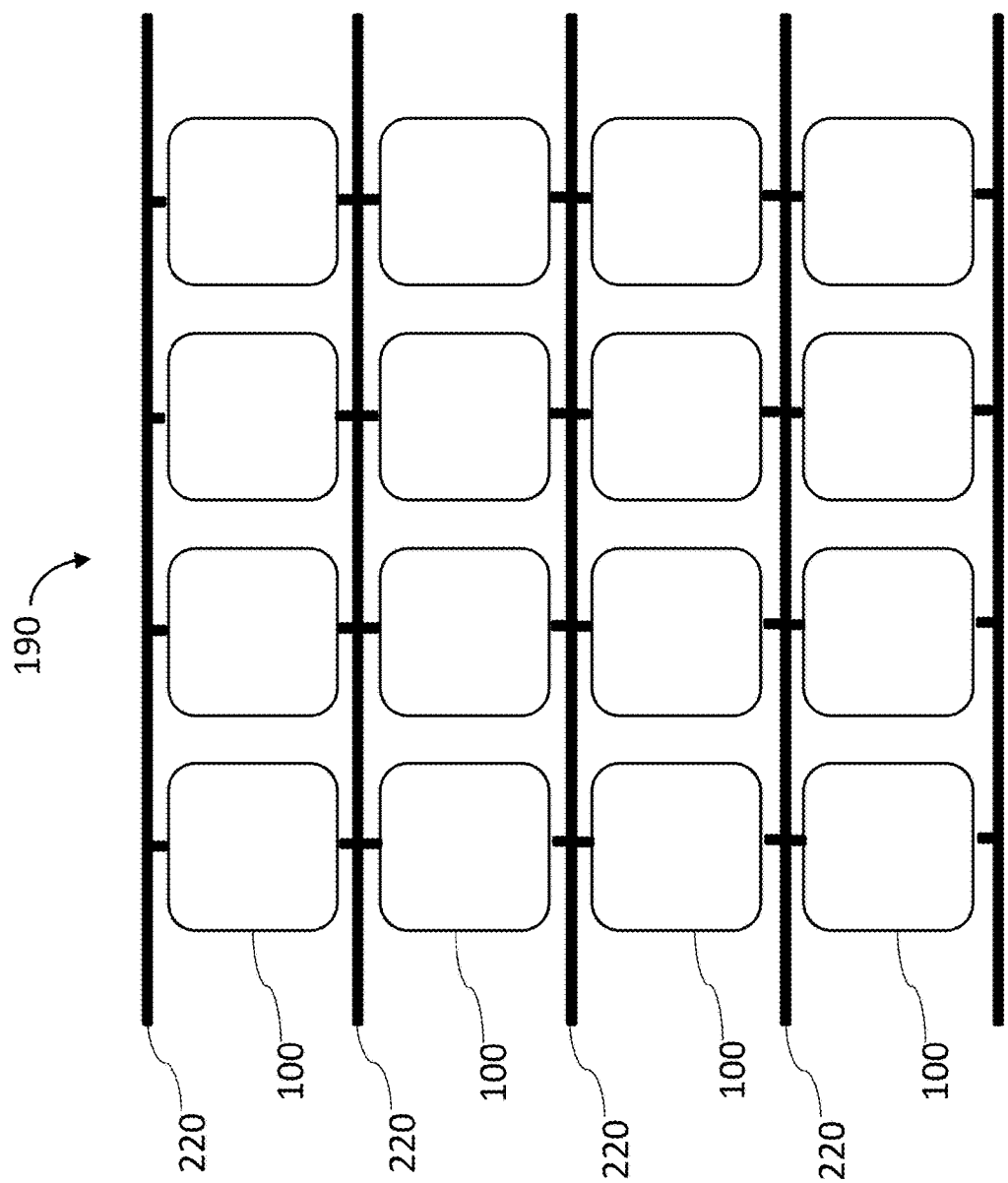
Figure 10C:
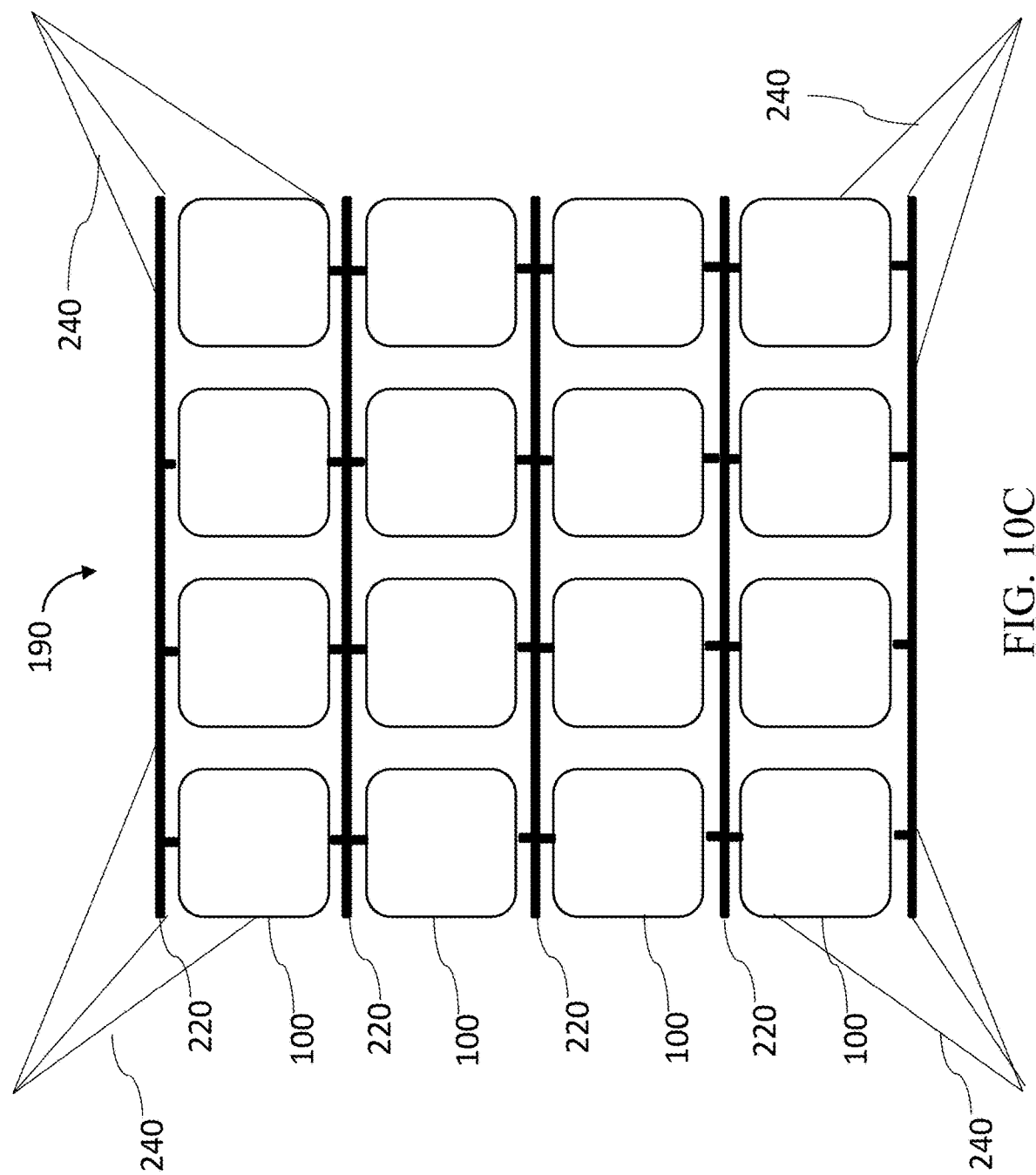

FIGS. 10A-10C illustrate a system comprising an array field 190 of solar panel modules 100 (FIGS. 1A-1D) of the present invention. In some embodiments, array field 190 of the present invention may comprise a plurality of modules 100 arranged according to several assembly schemes, e.g., in rows and columns. Typically, a field will assume a generally rectangular or square geometry, though such a geometry is not required. In some embodiments, the array field 190 can assume an irregular shape as it may be conformed to the area shape of the body of water on which it is installed.

In some embodiments, the modules 100 in array field 190 may be interconnected using a rigid frame system 220. In some embodiments, two or more modules 100 in an array filed may be in fluid communication, wherein a fluid level in respective containers 140 in each module 100 may correspond among all modules 100 in fluid communication. In some embodiments, such fluid communication may be done across a row, column, diagonally, and/or an entire array filed 190. In some embodiments, such fluid communication works to substantially equalize a fluid pressure and/or a fluid level inside each respective container 140 within the communicating modules 100.

In some embodiments, the bases 110/102 and/or containers 140 form a matrix of bases 110/102 and containers 140. In some embodiments, the bases 110/102 and/or containers are positioned in relation to each other as to form patterns. In some embodiments, specific patters of the positioned of the bases 110/102 and/or containers 140 correspond to specific buoyancy levels throughout the matrix, and, in some embodiments, the specific patters generate specific tilting patterns of the support frame 170 and/or of the panels.

In some embodiments, the interconnectors 220 may be configured for withstanding movement caused by wind, waves, and/or currents. In some embodiments, the system may be designed to withstand wave conditions having a wave height of up to 50 cm and a wave length of up to 400 cm. Accordingly, as illustrated in FIG. 10A, in wave conditions which cause uneven surface level, the present system as a whole may be configured for supporting the weight of individual modules as they heave and bob in the waves. As noted above, base 110 is configured for a controlled fluid flow between interior chamber 118 and the body of water, so as to avoid any abrupt fluid level changes within interior chamber 118 in uneven water level conditions.

In some embodiments, an array field of the present invention may comprise a closed fluid filling/emptying system, wherein fluid may be transferred from one or more containers 140 to other containers 140 within the array. For example, a number (e.g., half) of modules in an array may be inverted, such that for half the array, filling containers 140 with more fluid causes a tilting motion in a first direction, wherein for the second half, emptying containers 140 causes a tilting motion in the same first direction. Thus, by transferring fluid within the closed system array from the first half of containers 140 to the second half, there is achieved a coordinated tilting movement of all solar panels in array 190 in the same direction.

In some embodiments, the modules 100 in array field 190 may be spaced in accordance with ambient wave conditions of the body of water in which the system will be deployed. Thus, e.g., the spacing of modules relative to one another can be tailored to minimize roll, pitch, yaw, heave, surge and sway under the wave conditions most likely to be encountered in the particular environment of use.

In some embodiments, an array field 190 of the present invention may be configured for achieving different ground cover ratios (GCR) of solar panels to field area.

In some embodiments, the field 190 of the present invention may be configured for adjusting the GCR of solar panels, by adjusting the distance between two or more rows of modules and/or panels. In some embodiments, the distance between two or more rows is adjusted such that the GCR value is maximal. In some embodiments, the distance between two or more rows, and the related GCR, is adjustable such that for a specific origin direction of sunlight, no row of panels casts a shadow over another row of panels. In some embodiments, a reduced GCR increases efficiency and yield when using bi-facial solar panels.

In some embodiments, solar panels 160 in array field 190 may be interconnected so as to move in unison along, e.g., each row of array field 190. In some embodiments, solar panels rows in array field 190 may be interconnected so as to move in unison along.

In some embodiments, a supply grid of pipes 150 may connected to each module within an array field 190, to enable fluid feed into each container 140, as described above with reference to FIG. 8.

In some embodiments, the supplied fluid may contain one or more of additives, supplements, and/or filtered fluid. for example, in some embodiments, the fluid comprises additives configured to prevent fluid freezing, bacterial growth within the fluid, and/or prevention of mineral deposits within the fluid system.

Referring to FIG. 10C, there is shown in schematic top plan view a mooring approach used to stabilize and protect array field 190 of the present invention. Assuming a rectangular field shape, the mooring and anchoring system of the present invention may use one or more running lines 240 for each of the four corners of the rectangle quadrants. The line 240 may extends outwardly from the array to reach, e.g., onshore anchor points, a mooring buoy, etc. In some embodiments, lines 240 may be connected to a pulley system, a winch system, and/or a similar system, to facilitate lateral translation of the array into different azimuth angles, as may be beneficial for azimuth tracking of the sun and during, e.g., different seasons of the year, or in different sea or wind conditions.

Figure 10D:
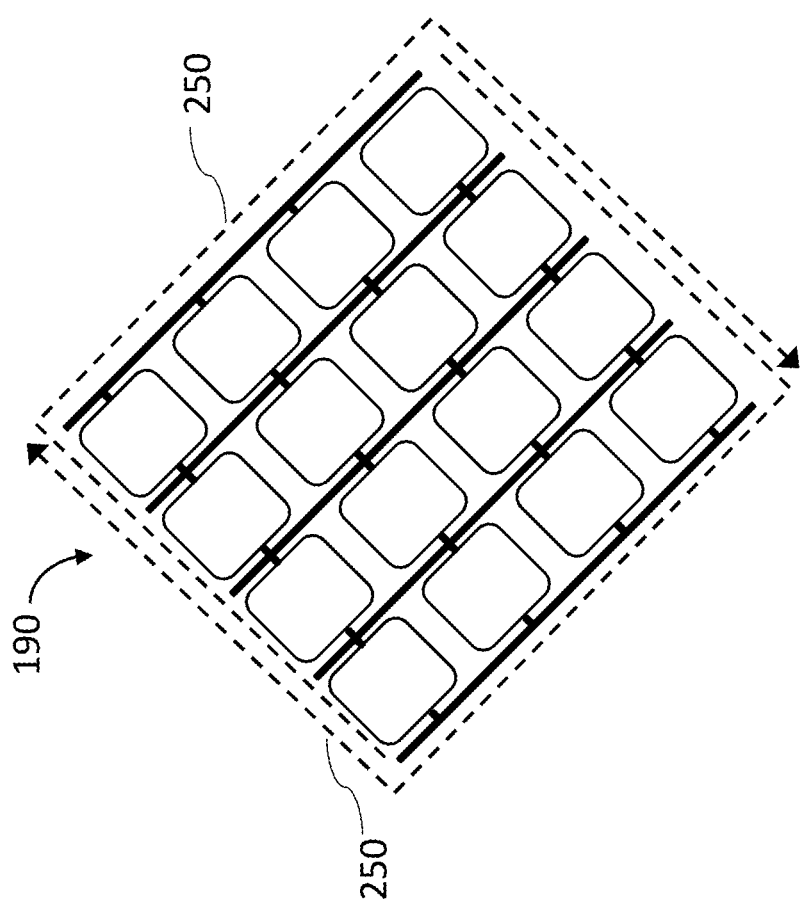

In some embodiments, as depicted in FIG. 10D, a mooring and anchoring system of the present invention may comprise a horizontal 'yo-yo'-like arrangement in which two or more lines 250, 260 wrap around an array in opposing directions, so as to facilitate rotational positioning of the array. Thus, a rotational force applied to the array by an ambient element (e.g., wind), will tend to loosen a first line (e.g., line 250) while building tension in a second line (e.g., line 260). Once the rotational force is removed, the tensioned line 260 tends to return array 190 to its original orientation. In some embodiments, lines 250, 260 may be used to rotate array 190 into a desired position. In some embodiments, such rotational positioning may permit rotating array 190 more than 180 degrees in either side.

In some embodiments, a system of the present invention may comprise a control unit which may be located, e.g., onshore. The control unit may be connected to a plurality of pumps and valves, configured for remotely controlling and adjusting a fluid level within containers 140 by feeding and emptying containers 140 through pipes 150, as may be necessary. In some embodiments, one or more pumps are configured for pumping liquid into and/or out of the container 1140/140.

In some embodiments, the system comprises two or more groups of modules, wherein the support frames 170 of each group rotate in different directions. Therefore, for one group, fluid filling the containers causes a tilt of the support frames 170 in a first direction, and for a second group, fluid filling the containers causes a tilt of the support frames 170 in a second direction. In some embodiments, the containers are in fluid communication such that fluids emptying from one group of containers are the same fluids used to fill the second group of containers.

In some embodiments, different portions of the system are in fluid communication such that the communicating containers comprise a same level of fluid in relation to each other. In some embodiments, the portions which are in fluid communication are one or more of rows of containers within the system, portions of rows of containers within the system, and one or more patterns of containers within the system.

In some embodiments, the system comprises one or more additional liquid sources in fluid communication with one or more of the containers. In some embodiments, the additional liquid sources may stream liquid into one or more containers at an equal rate. In some embodiments, the additional liquid source is configured to adjust the flow rates of the plurality of containers of the system. In some embodiments, the additional liquid source is configured to adjust the flow rates of the plurality of containers of the system such that the frames of the panels are tilted at the same angle and/or at the same velocity.

Tilt Mechanism

Figure 11A:
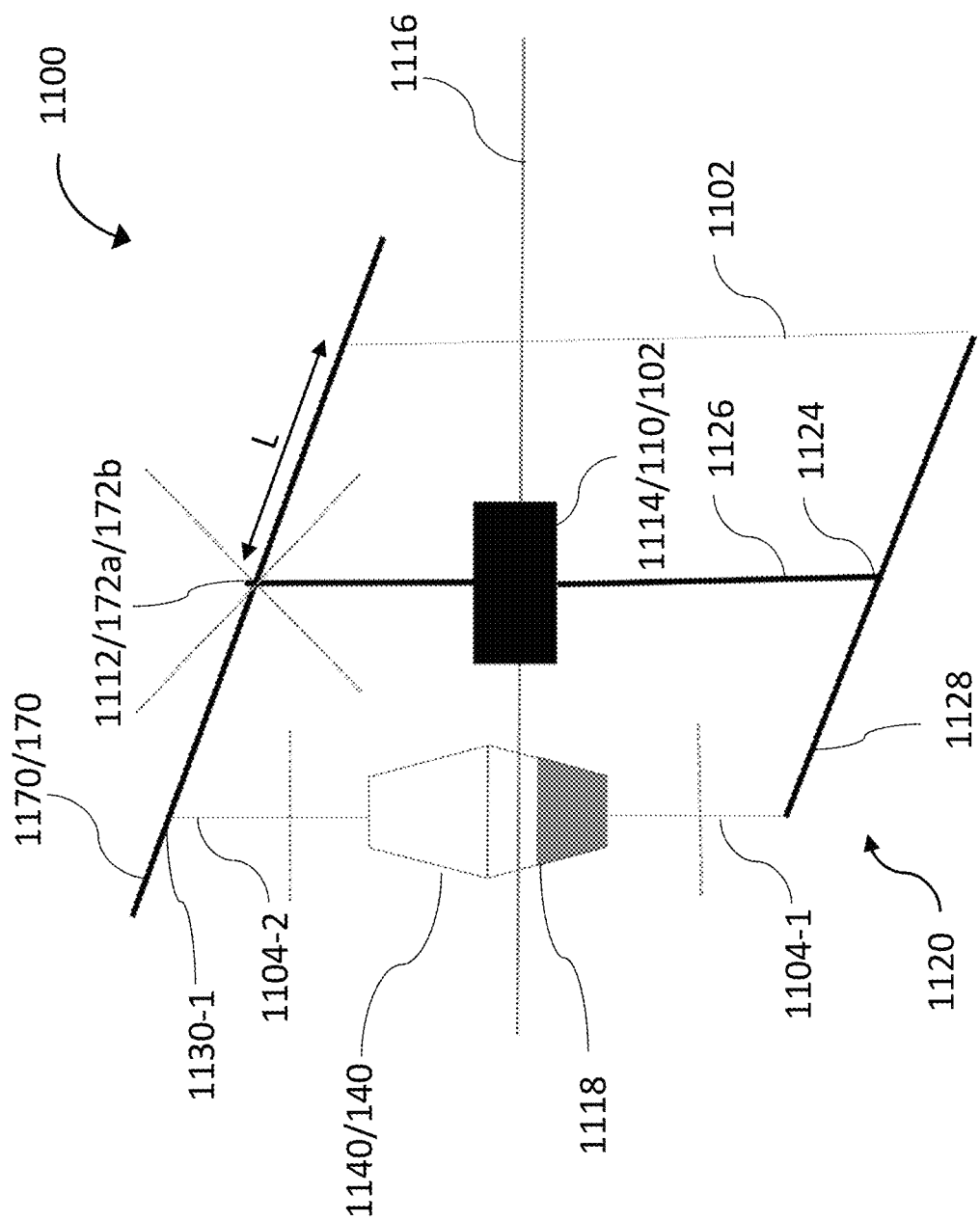
FIGS. 11A-11C illustrate a system comprising a floating solar panel module, in accordance with some embodiments of the present invention.
Figure 11B:
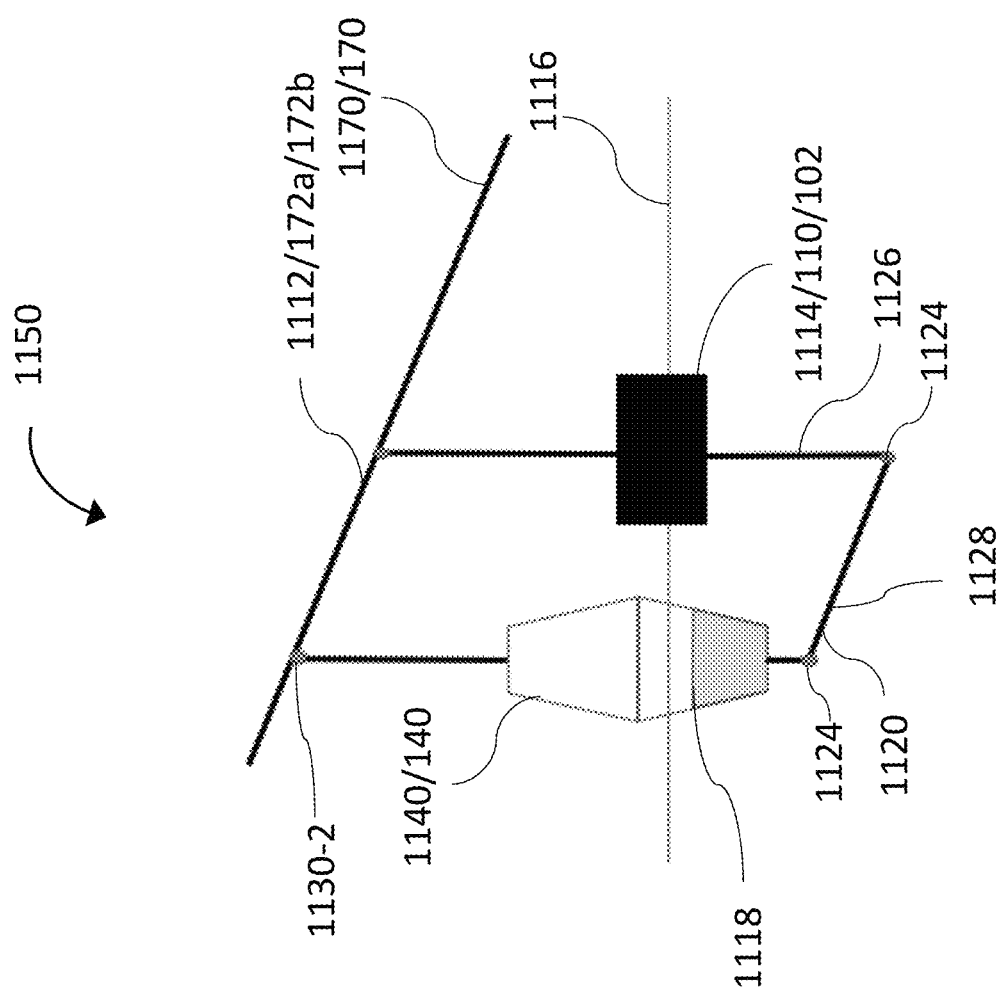
Figure 11C:
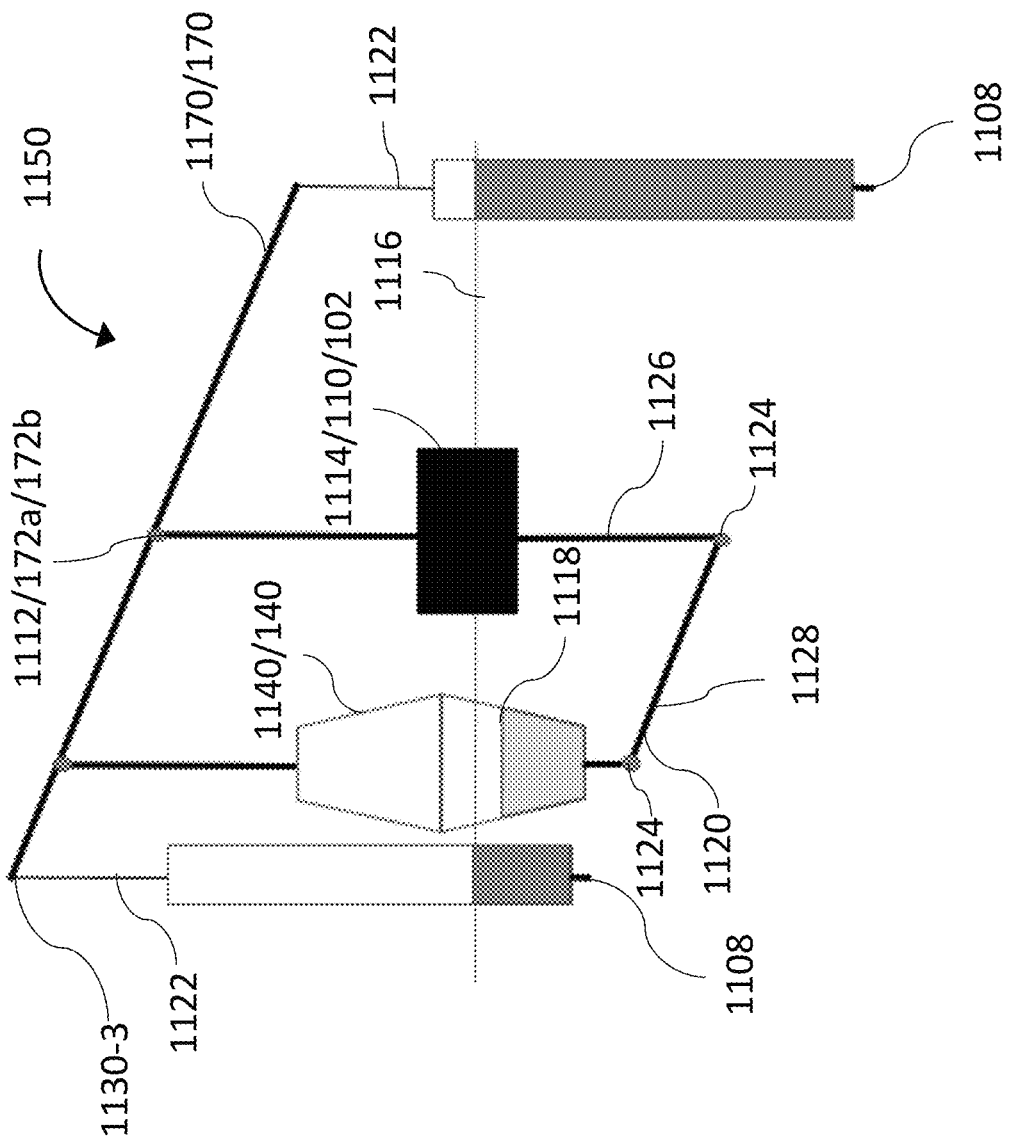

Reference is made to FIGS. 11A, 11B, and 11C, which illustrate a system comprising a floating solar panel module, in accordance with some embodiments of the present invention.

In some embodiments, the angle of the support frame 1170/170 is adjusted in accordance with the height of the container 1140/140 and in relation to the fluid level 1116 surrounding the base 1114/110/102. In some embodiments, the height of the container 1140/140 is adjustable via change of one or more of the vertical axial range of motion of the container 1140/140, the rotational range of motion of the support frame 1170/170, the friction levels of the tilt mechanism, the volume of the container 1140/140, the weight of the container 1140/140, and the circumference of the container as a function of the axial length of the container 1140/140.

In some embodiments, the support frame 1170/170 is coupled to the container via one or more cables 1102/1104. In some embodiments, the support frame 1170/170 is attached by one or more cables 1102/1104 to the container 1140 by a hinge. In some embodiments, the base 1114/110/102 and/or container 1140/140 are coupled to a base frame 1120. In some embodiments, the base frame 1120 is coupled to the support frame 1170/170 via the base 1114/110/102.

In some embodiments, the base frame 1120 is configured to balance the movement of the support frame 1170/170. In some embodiments, the base frame 1120 is parallel to the support frame 1170/170. In some embodiments, the base frame 1120 comprises a rod 1126 coupled to the base 1114/110/102. In some embodiments, the base frame 1120 comprises a moveable portion 1128 coupled to the rod 1126 and/or to the base 1114/110/102 by one or more hinges 1124. In some embodiments, the moveable portion 1128 rotates about the hinges 1124.

In some embodiments, one or more cables 1104 extend from two or more ends of the container 1140/140 such that one portion of the cable 1104-1 is coupled to the container 1140/140 on one end and to the base frame 1120 at a second end of the portion of the cable 1104-1. In some embodiments, one or more cables 1104 extend from two or more ends of the container 1140/140 such that one portion of the cable 1104-2 is coupled to the container 1140/140 on one end and to the frame 1170/170 at a second end of the portion of the cable 1104-2.

In some embodiments, tension within the cables 1102/1104 is generated if the container is mechanically unbalanced, for example, if the buoyancy force of container 1140/140, and the gravity force of the container 1140/140 and the fluid within it, are unbalanced. In some embodiments, during a mechanically unbalanced state, the container 1140/140 will move vertically, at least in part, in correspondence with the movement of the module 1100/110/100, until the forces acting on the container 1140/140 achieve equilibrium. In some embodiments, the forces acting on the container comprise one or more of forces extracted by the movements of the base 1114/110/102, gravitational and buoyancy forces, and external forces such as those created by wind currents. In some embodiments, the fluid within the container 1140/140 weighs down the container 1140/140. In some embodiments, the weight of the fluid within the container 1140/140 balances the buoyancy forces of the container 1140/140.

In some embodiments, the balance of the forces acting on the container is controllable by controlling the rate in which liquid enters and/or exits the container. In some embodiments, addition or removal of liquid from the container increases or decrease the force required to balance the container and/or the module 1100/110/100. Therefore, in some embodiments, controlling the amount of liquid entering and/or exiting the container controls the angle of the support frames 1170/170 of the module 1100/110/100.

In some embodiments, the movement of the container correlates with the area of the cross section of the container which crosses the fluid level 1116. In some embodiments, such as depicted by FIGS. 11A-11C, the container 1140/140 comprises a conical shape configured such that the amount of liquid required to fill each level 1118 across the length of the container 1140/140 is different. In some embodiments, the amount of liquid required to fill the length of the container 1140/140 increases from one end of the container 1140/140 to the other. In some embodiments, the amount of liquid required to fill the length of the container 1140/140 increases from a first end of the container up to a midsection of the container, then begins decreasing up to the second end of the container 1140/140.

In some embodiments, the vertical movement of the container corresponds to the rate of change of the liquid volume within the container. In some embodiments, the speed of the vertical movement of the container from a first location point 1 to a second location point 2 can be described as a function of the flow rate into/out of the container and/or the volume change of the liquid within the container, for example, as depicted by the following equation:

$$v_v = \frac{\Delta Z}{t} = \frac{\Delta Z}{\Delta V / FlowRate} = \frac{Z_2 - Z_1}{(V_2 - V_1)/FlowRate} \left[ \frac{cm}{cm^3 / \frac{cm^3}{sec}} \right]$$

Wherein $\Delta Z$ comprises the difference of the height of the container between a first location point 1 and a second location point 2, $\Delta V$ comprises the difference in fluid volume within the container between a first location point 1 and a second location point 2, Flowrate comprises the rate of fluid flow into and/or out of the container, and $v_v$ comprises the velocity of the movement of the container, measured in cm/second. In some embodiments, the above equation is simplified and does not include the effect on $v_v$ by the changing weight of the container, caused by the changing height of the container in relation to the fluid level 1116.

In some embodiments, the speed of the vertical movement $v_v$, of the container from a first location point 1 to a second location point 2 is a function of the changing weight of the container between point 1 to point 2. In some embodiments, the vertical movement of the container from a first location point 1 to a second location point 2 is a function of the liquid volume change within the container. In some embodiments, the function of the liquid volume change within the container is non-linear. In some embodiments, it is appropriate to measure the weight of the container in the water and out of the water at both of the location points 1 and 2 and integrate both measures in the vertical speed calculating. The difference in the weights corresponds with, at least, part of the chamber of the container, below the fluid level 1116, which remains hollow at each of the location points 1 and 2. In some embodiments, the portion of the container below fluid level 1116 which is not filled with liquid, that is needed to maintain equilibrium of buoyancy versus weight forces, changes within a same container moving from point 1 to point 2 or vice versa. In such a movement, the difference in magnitudes between the gravitational forces and the buoyancy is balanced by the liquid volume within the container, which may increase or decrease in order to achieve equilibrium. Along with a volume change of the liquid within the container, the container therefore moves vertically under the exerted forces and/or due to the liquid volume changes within the container. In some embodiments, the calculation of the velocity of such movement therefore depends, at least in part, on the change in liquid volume within the container 1140/140. In some embodiments, the speed of the vertical movement $v_v$, considering the changing weight of different portions of the container, for example, the portions above and below the fluid level 1116, is depicted by the following equation:

$$v_v = \frac{\Delta Z}{t} = \frac{\Delta Z}{\left(\Delta V - \frac{\Delta M}{\rho_w}\right) / FlowRate} =$$

$$\frac{Z_2 - Z_1}{\left(V_2 - V_1 - \frac{M_2 - M_1}{\rho_w}\right) / FlowRate} \left[\frac{cm}{\left(cm^3 - \frac{kg}{kg/cm^3}\right) / \frac{cm^3}{sec}}\right]$$

Wherein $M_1$, $M_2$ are the masses of the portions of the container above fluid level 1116, at the first location point 1 and the second location point 2, and $\rho_w$ is the density of the fluid.

In some embodiments, the angular velocity is derived from the vertical velocity and the length between the axis of rotation and the point onto which force is exerted due to the vertical movement.

$$\omega = \frac{v_v}{r}$$

Wherein r is the distance between the axis of rotation and the point in which the cables are connected, e.g., points 1130-1/1130-2 as depicted in FIGS. 11A and 11B respectively.

In some embodiments, the amount of force required to change the position of the support frames 1170/170 is derived from the inner forces acting within the module 1100/110/100 and the external forces exerted onto the module 1100/110/100.

In some embodiments, the inner forces include friction between interacting portions of the module 1100/100 and forces created by the position of the center of mass of frame 1170/170 in relation to its rotational axis. In some embodiments, when the center of mass is positioned above its rotational axis, the support frames 1170/170 may tilt and fall to the side of the modules 1100/110/100. In some embodiments, for larger angels, the force of the fall of the support frames 1170/170 may increase. In some embodiments, when the center of mass is positioned below its rotational axis, and no other forces applied to it, the support frames 1170/170 tilt to reach a horizontal state.

In some embodiments, the external forces exerted on the module 1100/110/100 include forces of wind currents which are exerted mainly on the support frames 1170/170. In some embodiments, the external forces exerted on the module 1100/110/100 include the dynamic weight additions to the system, such as maintenance people, animals, such as, for example, birds resting on the module 1100/110/100, precipitants, and water sprayed, forces onto the module 1100/110/100 applied by waves.

In some embodiments, and in order to control and/or supervise the movement of the module 1100/110/100 and/or of the support frames 1170/170, the module 1100/100 is structured such that the moment, or the force of the container times the length of the shaft in relation to the pivot point 1112/172a/172b of the axis of rotation (e.g., the length L of the support frames 1170/170 as depicted in FIG. 11A), is larger than the sum of the external and internal forces exerted onto the module 1100/110/100 and/or support frames 1170/170. In some embodiments, the same process can be calculated for when the movement of the module 1100/110/100 is controlled by a plurality of gears types. In some embodiments, the plurality of gear types is configured to convert the vertical movement of the container into angular movement of the support frames 1170/170.

In some embodiments, using the container 1140/140 and/or the buoyancy of the container 1140/140 and/or the weight of water inside the container 1140/140 allows countering the rotational forces which are extracted onto the support frames 1170/170. In some embodiments, the main external rotational force is exerted onto the support frames 1170/170 by wind. In some embodiments, the container 1140/140 is coupled to the support frames 1170/170 via one or more cables and/or rods, such that the external forces applied to the support frames 1170/170 are exerted onto the container 1140/140 and are countered by the buoyancy or weight of the container 1140/140, thereby preventing excessive movement of the support frames 1170/170.

In some embodiments, the buoyancy of the container 1140/140 and/or gravitational forces of the container change in accordance with a change of strength and/or direction of the wind, to maintain equilibrium of forces. These changes of forces directly counter the rotational force applied by the wind on frame 1170/170 with no rotational stress applied on the pivot point 1112/172a/172b. In some embodiments, the position of the module 1100/110/100 is adjusted to compensate the effect of variable wind speed in such a way that the module 1100/110/100 is at mechanical equilibrium at the desired angle of frame 1170/170, and no rotational countering forces (to differentiate from e.g., linear forces acting on the module), stress the different portions of the module 1100/110/100, for example, the pivot point 1112/172a/172b.

In some embodiments, the forces of the winds cause undesired movement of the support frame 1170/170. In some embodiments, the forces of the winds cause the support frame 1170/170 to move such that the support frame 1170/170 is not positioned at a desired angle. In such cases, the container 1140/140, which is coupled to the support frame 1170/170 moves vertically in relation to the water level 1116, which in turn may cause the buoyancy and weight forces to get out of balance, causing a dynamic force, opposite in direction to the undesired movement. In some embodiments, the magnitude of these dynamic forces of buoyancy and weight, correspond to the change of angle of the support frame 1170/170 from its desired position. For example, for forces that cause an increase of the angle of the support frame 1170/170 in relation to the desired position, thereby pushing the container 1140/140 downward into the water, the countering buoyancy of the container increases in magnitude as the frame 1170/170 is pushed away from its desired position. in some embodiments, such dynamically damping forces push frame 1170/170 back to equilibrium at the desired position.

In some embodiments, a cross section plane of the container 1140/140, which is parallel to the fluid level 1116 in which the container 1140/140 floats, defines the magnitude of the buoyancy and weight forces acting to maintain equilibrium in the desired position. In some embodiments, the geometry of the container 1140/140 is structured such that the cross section of the container 1140/140 varies along the vertical movement range. In some embodiments, the container 1140/140 is structured such that the area of transverse cross section of the container 1140/140 is sufficient for the buoyancy and weight to counter to wind forces.

In some embodiments, the area of the transverse cross section is adjusted in each container 1140/140 in accordance with some embodiments of the present invention the desired vertical range of motion. For example, in the illustration depicted by FIG. 11B, the magnitude of the buoyancy and weight forces generated at each repeating section of the vertical movement range (e.g. 1 cm), is greatest in the midsection of the vertical movement range while the support frames 1170/170 area horizontal and/or parallel to the fluid level 1116.

In some embodiments, apart from the damping forces achieved by the container 1140/140, the module comprises an added, undesired forces dampening mechanism. In some embodiments, the module comprises a force dampening mechanism. For example, in some embodiments, the mechanism comprises an additional one or more of a bucket, a bag, or container.

In some embodiments, such as in the exemplary embodiment depicted by FIG. 11C, the module 1150/1100/110/100 comprises one or more additional containers 1108. In some embodiments, the one or more additional containers 1108 are coupled to the support frame 1170/170 at one or more ends thereof. In some embodiments, the one or more additional containers 1108 are coupled to the support frame 1170/170 via one or more cables 1122.

In some embodiments, the additional containers 1108 comprise a chamber configured to fill with fluid. In some embodiments, the additional containers 1108 comprise one or more apertures 1110 which are configured to provide fluid communication between the chamber of the additional container 1108 and the body of water. In some embodiments, the flow of fluid into and out of the containers 1108 is determined by the size of apparatus 1110. In some embodiments, the desired speed of frame 1170/170 moves container 1108 vertically upward or downward, causing water from the body of water to flow into or out from the containers at a certain speed according to containers 1108 cross section at water level 1116. In some embodiments, the apparatus 1110 is sized so as to allow the free flow of water caused by the desired, normally slow, speed of the frame 1170/170.

In some embodiments, the external forces acting on the module 1150/1100/110/100 push frame 1170/170 from its desired position at speed higher then desired. In some embodiments, for such undesired speeds, due to the restrained flow allowed through apparatus 1110, fluid flow into and/or out of the additional containers 1108 through the one or more apertures 1110, is insufficient to maintain equilibrium. Accordingly, either water accumulate in container 1108 above water level 1116, or a section empty of fluid, is generated in container 1108, bellow water level 1116. In both cases buoyancy or weight forces generated are at opposite direction of the undesired movement and may be used as added damping forces. In some embodiments, and similarly to the container 1140/140 undesired movements and the counter, weight and buoyancy, forces generated by them, the magnitude of the damping forces generated by containers 1108 is getting stronger as the undesired speed of the table is higher. Thereby, in some embodiments, for cases in which the angle of the position of the support frame 1170/170 in relation to the desired position of the support frame 1170/170 increases in higher undesired speeds, then the countering force exerted onto the module 1150/1100/110/100 by the additional container 1108 increases. In some embodiments, for example, such as depicted in 11D, having containers 1108 on both sides of frame 1170/170 allows using only the added weight generated in higher than desired frame speeds. According to the direction of undesired speed water in containers 1108 accumulate above water level 1116 in either sides of the frame, generating an equivalent damping force pulling the frame back to the desired position through cables 1122.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A buoyant module comprising:
   at least one base configured for being buoyantly supported within a body of water;
   at least one fluid-holding container sized and fitted for being connected with said at least one base for movement in a vertical dimension relative to said at least one base
   wherein a vertical position of said at least one fluid-holding container relative to said base is determined, at least in part, by a fluid level in said at least one fluid-holding container; and
   at least one mount coupled to said at least one base in a sealing engagement against the entrance of egress of liquids into the interior of said at least one base and configured for pivotably mounting at least one solar panel thereon,
   wherein said solar panel is tiltable about a pivot point relative to said mount, and wherein said mount comprises at least one opening sized and shaped to fit said at least one container and enable said movement in said vertical dimension.

2. The module of claim 1, wherein said at least one base comprises at least two hulls arranged in a spaced-apart position, wherein said hulls are rigidly interconnected to one another, and wherein said at least one fluid-holding container is disposed therebetween said hulls, further wherein said hulls are made of at least one selected from a group consisting of solid, at least partially hollow, entirely hollow hulls and any combination thereof.

3. The module of claim 1, wherein at least one of the following is being held true (a) said at least one base is at least partially filled with a ballast comprising at least one selected from a group consisting of a liquid, a solid, and any combination thereof; (b) said base is in fluid communication with said body of water; (c) any combination thereof.

4. The module of claim 1, further comprising a tilt mechanism configured for translating said movement in said vertical dimension of said at least one fluid-holding container into said pivotable motion of said at least one solar panel about said pivot point; further wherein said tilt mechanism is configured for tilting said at least one solar panel between 25° and 75° to either side relative to the horizontal; in response to at least one selected from a group consisting of the sun direction, wind, ambient conditions, changing seasons and any combination thereof.

5. The module of claim 4, wherein said tilt mechanism comprises one at least one mechanism selected from a group consisting of: (a) a cable-and-pully tilt mechanism, comprising: (i) at least one first cable coupled to the upper portion of said at least one fluid-holding container; (ii) at least one second cable coupled to the bottom portion of said at least one fluid-holding container; said at least one first cable and said at least one second cable are coupled to said at least one solar panel at two opposing ends thereof, such that said vertical movement of said at least one fluid-holding container exerts pulling forces on at least one selected from a group consisting of at least one first cable, at least one second cable and any combination thereof to result in pivoting movement of said at least one solar panel, (b) a crank-like tilt mechanism, (c) an arcuate slot tilt mechanism, comprising: at least one support frame in communication with said at least one solar panel, comprising one or more brackets having an arcuate guide slot wherein said at least one fluid-holding container is in communication with at least one guide pin fitted within said guide slot; such that said movement in said vertical dimension of at least one fluid-holding container is thus translated into angular movement of said support frame and said at least one solar panel, (d) a parallelogram with an underwater symmetrical frame, and (e) a parallelogram with an underwater asymmetrical frame and push/pull rods.

6. The module of claim 1, further comprising a control unit in fluid communication with said at least one fluid-holding container, wherein the control unit is configured for selectively adjusting a fluid level within said at least one fluid-holding container further wherein at least one of the following is being held true (a) said module further comprising at least one pipe connected between said control unit and said at least one fluid-holding container; (b) said control unit further comprises at least one pump configured for pumping said fluid into and/or out of said at least one fluid-holding container through said at least one pipe; (c) said control unit is configured for adjusting said fluid level within said at least one fluid-holding container based, at least in part, on the position of the sun on the ecliptic in respect to the geographic location of the module; (d) said module further comprising at least one pipe; said pipe is mounted to the bottom-most part of said at least one fluid-holding container and has at least one flexible portion not to disrupt said aid movement in the vertical dimension of said at least one fluid-holding container; (e) said module additionally comprising at least one pump in a closed fluid filling/emptying system, wherein fluid may be transferred from said at least one fluid-holding container to another; and (f) any combination thereof.

7. A system comprising:
a plurality of buoyant modules comprising each:
at least one base configured for being buoyantly supported within a body of water, and
at least one fluid-holding container sized and fitted for being connected with said at least one base, adapted for movement in the vertical dimension relative to said at least one base, wherein a vertical position of said at least one fluid-holding container relative to said at least one base is based, at least in part, on a fluid level in said at least one fluid-holding container;
at least one mount coupled to said at least one base in a sealing engagement against the egress of liquids into the interior of said at least one base and configured for pivotably mounting at least one solar panel thereon; and
the at least one solar panel,
wherein said solar panel is tiltable about a pivot point relative to said mount, and wherein said mount comprises at least one opening sized and shaped to fit said at least one container and enable said movement in said vertical dimension;
a framework comprising frame members configured for rigidly interconnecting at least two of said basis at to least one module from the plurality of buoyant modules in a specified arrangement; and
a control unit in fluid communication with each of said at least one fluid-holding container, wherein the control unit is configured for selectively adjusting a fluid level within said at least one fluid-holding container.

8. The system of claim 7, wherein said plurality of modules is arranged in a grid array field comprising at least one row and at least one column.

9. The system of claim 7, wherein said at least one base comprises at least two hulls arranged in a spaced-apart position, wherein said hulls are rigidly interconnected to one another, and wherein said space is disposed there between said hulls; further wherein said hulls are made of at least one selected from a group consisting of solid, at least partially hollow, entirely hollow hulls and any combination thereof.

10. The system of claim 7, wherein said at least one of the following is being held true (a) base is at least partially filled with a ballast comprising at least one selected from a group consisting of liquid, solid and any combination thereof; (b) said base is in fluid communication with said body of water; (c) any combination thereof.

11. The system of claim 7, wherein said at least one base further comprises a tilt mechanism configured for translating said movement in said vertical dimension of said at least one fluid-holding container into said pivotable motion of said at least one solar panel about said pivot point; further wherein said tilt mechanism is configured for tilting said at least one solar panel between 25° and 75° to either side relative to the horizontal; further wherein said tilt mechanism is configured such that a center of gravity of said solar panel is located below or on said pivot point.

12. The system of claim 11, wherein said tilt mechanism comprises at least one mechanism selected from a group consisting of (a) a cable-and-pully tilt mechanism comprising: (i) at least one first cable coupled to the upper portion of said at least one fluid-holding container; (ii) at least one second cable coupled to the bottom portion of said at least one fluid-holding container; said at least one first cable and said at least one second cable are coupled to said at least one solar panel at two opposing ends thereof, such that said vertical movement of said at least one fluid-holding container exerts pulling forces on at least one selected from a group consisting of at least one first cable, at least one second cable and any combination thereof to result in pivoting movement of said at least one solar panel; (b) a crank-like tilt mechanism, (c) an arcuate slot tilt mechanism, comprising: at least one support frame in communication with said at least one solar panel, comprising one or more brackets having an arcuate guide slot wherein said at least one fluid-holding container is in communication with at least one guide pin fitted within said guide slot; such that said movement in said vertical dimension of at least one fluid-holding container is thus translated into angular movement of said support frame and said at least one solar panel; (d) a parallelogram with an underwater symmetrical frame, (e) a parallelogram with an underwater asymmetrical frame and push/pull rods and any combination thereof.

13. The system of claim 7, further comprising a control unit in fluid communication with said at least one fluid-holding container, wherein the control unit is configured for selectively adjusting a fluid level within said at least one fluid-holding container; further wherein at least one of the following is being held true (a) said module further comprising at least one pipe connected between said control unit and said at least one fluid-holding container; (b) said control unit further comprises at least one pump configured for pumping said fluid into and/or out of said at least one fluid-holding container through said at least one pipe; (c) said control unit is configured for adjusting said fluid level within said at least one fluid-holding container based, at least in part, on the position of the sun on the ecliptic in respect to the geographic location of the module; (d) said module further comprising at least one pipe; said pipe is mounted to the bottom-most part of said at least one fluid-holding container; (e) said module additionally comprising at least one pump in a closed fluid filling/emptying system, wherein fluid may be transferred from said at least one fluid-holding container to another; and (f) any combination thereof.

14. The system of claim 7, wherein at least one of the following is being held true (a) said at least one solar panels is further configured for tilting in unison; (b) said framework further comprises one or more lines configured for mooring said system; (c) said one or more lines are further configured for facilitating adjustment of an azimuth angle of said system; (d) said system additionally comprising at least one pump in a closed fluid filling/emptying system, wherein fluid may be transferred from said at least one fluid-holding container to another; and (e) any combination thereof.

15. A method comprising:
(a) providing the system of claim 7;
(b) rigidly interconnecting at least two bases of said at least one modules in a specified arrangement;
(c) fluidly connecting a control unit with said at least fluid-holding container, wherein the control unit is configured for selectively adjusting a fluid level within said at least one fluid-holding container; and
(d) deploying said system in a body of water.

16. The system of claim 7, wherein a speed of the vertical movement vv, considering a changing weight of said at least one fluid-holding container, is depicted by the following equation:
where $$v_v = \frac{\Delta Z}{t} = \frac{\Delta Z}{\left(\Delta V - \frac{\Delta M}{\rho_w}\right)/FlowRate} = $$

$$\frac{Z_2 - Z_1}{\left(V_2 - V_1 - \frac{M_2 - M_1}{\rho_w}\right)/FlowRate}\left[\frac{cm}{\left(cm^3 - \frac{kg}{kg/cm^3}\right)/\frac{cm^3}{sec}}\right]$$

M1, M2 are the masses of the portions of said at least one fluid-holding container above fluid level, at the first location point 1 and the second location point 2, and pw is the density of the fluid.

17. The system of claim 7, additionally comprising at least one force dampening mechanism, comprising at least one additional container, said at least one additional container is coupled to said framework, said at least one additional container comprises one or more apertures, configured to provide fluid communication between said at least one additional container and the body of water.

18. The system of claim 7, wherein at least one of the following is being held true (a) said at least one base defines a space therewithin; further wherein said at least one fluid-holding container is sized and fitted for being received within said space; (b) wherein said at least one base is a vessel and said space is an inner chamber of said vessel; further wherein said vessel is a double-walled vessel comprising an outer wall and an inner wall, and wherein an interspace between said outer and inner walls is configured for being at least partially filled with a ballast comprising at least one selected from a group consisting of liquid, solid and any combination thereof; and (c) any combination thereof.

19. The module of claim 1, wherein at least one of the following is being held true (a) said at least one base defines a space therewithin; further wherein said at least one fluid-holding container is sized and fitted for being received within said space; (b) wherein said at least one base is a vessel and said space is an inner chamber of said vessel; further wherein said vessel is a double-walled vessel comprising an outer wall and an inner wall, and wherein an interspace between said outer and inner walls is configured for being at least partially filled with a ballast comprising at least one selected from a group consisting of liquid, solid and any combination thereof; (c) any combination thereof.

* * * * *